US012601185B2

(12) United States Patent
Chen et al.

(10) Patent No.: US 12,601,185 B2
(45) Date of Patent: Apr. 14, 2026

(54) AUTOMATIC SIDE WALL DEPLOYMENT SYSTEM

(71) Applicant: A&C FUTURE, INC., Newport Beach, CA (US)

(72) Inventors: Shoue Chen, Irvine, CA (US); Qiyin Pan, Irvine, CA (US); Jiuqi Wang, Santa Ana, CA (US); Han Qin, Newport Beach, CA (US); Jiayang Qin, Newport Beach, CA (US)

(73) Assignee: A&C FUTURE, INC., Irvine, CA (US)

( * ) Notice: Subject to any disclaimer, the term of this patent is extended or adjusted under 35 U.S.C. 154(b) by 156 days.

(21) Appl. No.: 18/525,589

(22) Filed: Nov. 30, 2023

(65) Prior Publication Data

US 2025/0179815 A1 Jun. 5, 2025

(51) Int. Cl.
*E04F 15/024* (2006.01)
*E05D 15/06* (2006.01)

(52) U.S. Cl.
CPC .... *E04F 15/02494* (2013.01); *E05D 15/0608* (2013.01); *E05Y 2900/142* (2013.01)

(58) Field of Classification Search
CPC ........... E04F 15/02494; E05D 15/0608; E05D 15/266; E05D 15/264; B60P 3/34; B60P 3/48; B60P 3/481; E06B 3/488; E06B 3/509; E04B 2/827; E04H 2001/1283; E05Y 2900/142
See application file for complete search history.

(56) References Cited

U.S. PATENT DOCUMENTS

| | | | | | |
|---|---|---|---|---|---|
| 1,833,496 | A * | 11/1931 | Phillips | E06B 3/481 16/104 |
| 2,944,282 | A * | 7/1960 | Greco | E06B 3/924 49/425 |
| 4,120,124 | A | 10/1978 | Temple et al. | |
| 5,125,202 | A * | 6/1992 | Kissinger | E04B 2/827 49/404 |
| 5,230,123 | A | 7/1993 | Williams et al. | |
| 6,481,359 | B1 | 11/2002 | Owens | |
| 2001/0037613 | A1 | 11/2001 | Owens | |
| 2003/0183350 | A1 | 10/2003 | Goldsmith et al. | |
| 2014/0290878 | A1* | 10/2014 | Balay | E06B 3/483 160/205 |
| 2016/0251852 | A1* | 9/2016 | Dickson | E05F 15/70 160/7 |
| 2018/0073244 | A1* | 3/2018 | Conybeare | E04B 1/7612 |

(Continued)

FOREIGN PATENT DOCUMENTS

DE 202008011015 U1 * 12/2008 ......... E05D 15/0608

*Primary Examiner* — Theodore V Adamos
(74) *Attorney, Agent, or Firm* — INNOVATION CAPITAL LAW GROUP, LLP; Vic Lin

(57) ABSTRACT

An expandable structure has an expansion section with side wall panels that can stack into and be deployed from a wall enclosure central housing. A track can be deployed on the wall enclosure for facilitating the movement of wall panels into and out of the central housing. This innovative configuration not only enables efficient and accurate storage of each wall panel within the central enclosure but also concurrently serves as the foundational support structure for the cabin. After the wall panels are deployed and the structure is fully expanded, the wall panels can be tightened together to provide sound and weather protection.

19 Claims, 27 Drawing Sheets

(56) References Cited

U.S. PATENT DOCUMENTS

| | | | | |
|---|---|---|---|---|
| 2018/0209145 | A1* | 7/2018 | Dickson | E05D 15/0608 |
| 2018/0320432 | A1* | 11/2018 | Beeler | E05F 1/16 |
| 2019/0135161 | A1 | 5/2019 | Angelow | |
| 2021/0349480 | A1* | 11/2021 | Rebarchek | E04B 2/7401 |
| 2022/0170303 | A1* | 6/2022 | Janick | E05D 15/24 |
| 2023/0167636 | A1 | 6/2023 | Keller et al. | |

* cited by examiner

AUTOMATIC SIDE WALL DEPLOYMENT SYSTEM

BACKGROUND OF THE INVENTION

1. Field of the Invention

Embodiments of the invention relate generally to expandable structures. More particularly, embodiments of the invention relate to a side wall for an expandable structure where the side wall is formed from a plurality of panels that are pulled tightly together after deployment.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Recently, the expandable house structure is attracting more attention both in the fields of mobile homes and recreational vehicles (RVs). The expansion mode will determine the effective living area, complexity of the driving and control system, and cost for purchase and maintenance. Exploring a concise and reliable expansion mechanism is of great importance.

Traditional (RV) configurations have been characterized by a notably restricted slide-out area. The prevailing approach for RV manufacturers seeking to augment this limited space within the slide-out structure has been to enlarge the dimensions of the initial vehicle cabin. This, in turn, establishes a proportional relationship between the extent of the slide-out area and the available cabin space. However, such a solution comes with inherent limitations.

In view of the foregoing, there is a need for an expandable house structure that can expand living space with a refined slide-out configuration without sacrificing sound and weather protection.

SUMMARY OF THE INVENTION

Embodiments of the present invention aim to solve the aforementioned problems in conventional dining expandable structures by providing an expandable structure where the side wall is formed from a plurality of panels that are pulled tightly together after deployment.

Embodiments of the present invention provide an expandable structure comprising a main structure; a first expansion section, the first expansion section expandable outward in a first direction from the main structure to convert the expandable structure from a collapsed state to an expanded state; walls of the first expansion section are formed from a plurality of wall panels, the wall panels, in a retracted configuration, are stacked with planar interior or exterior faces adjacent each other; and a tightening system operable to push the plurality of wall panels together when in the expanded configuration.

Embodiments of the present invention provide an expandable structure comprising a main structure; a first expansion section, the first expansion section expandable outward in a first direction from the main structure to convert the expandable structure from a collapsed state to an expanded state; walls of the first expansion section are formed from a plurality of wall panels, the wall panels, in a retracted configuration, are stacked with planar interior or exterior faces adjacent each other; a first pin extending upward from a top of each wall panel of the plurality of wall panels, adjacent a leading edge; a second pin extending upward from the top of each wall panel of the plurality of wall panels, adjacent a trailing edge; a sliding track operable to move outward from the main structure, wherein each of the plurality of wall panels are attached to the sliding track; and a tightening system operable to push the plurality of wall panels together when in the expanded configuration, wherein the first pin is rotatably positioned in and slidable along a channel formed along a longitudinal axis of the sliding track; and the first pin of a leading one of the plurality of wall panels is fixable to the sliding track with a fixation pin.

Embodiments of the present invention provide an expandable structure comprising a main structure; a first expansion section, the first expansion section expandable outward in a first direction from the main structure to convert the expandable structure from a collapsed state to an expanded state; walls of the first expansion section are formed from a plurality of wall panels, the wall panels, in a retracted configuration, are stacked with planar interior or exterior faces adjacent each other; a first pin extending upward from a top of each wall panel of the plurality of wall panels, adjacent a leading edge; a second pin extending upward from the top of each wall panel of the plurality of wall panels, adjacent a trailing edge; a sliding track operable to move outward from the main structure, wherein each of the plurality of wall panels are attached to the sliding track; a tightening system operable to push the plurality of wall panels together when in the expanded configuration; a first cable interconnecting each second pin of each of the plurality of wall panels; and a plurality of second cables, each interconnecting adjacent ones of the plurality of wall panels, wherein each second cable is disposed in a first position when the expandable structure is in the collapsed state and movable into a second position when the expandable structure is in the expanded state.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
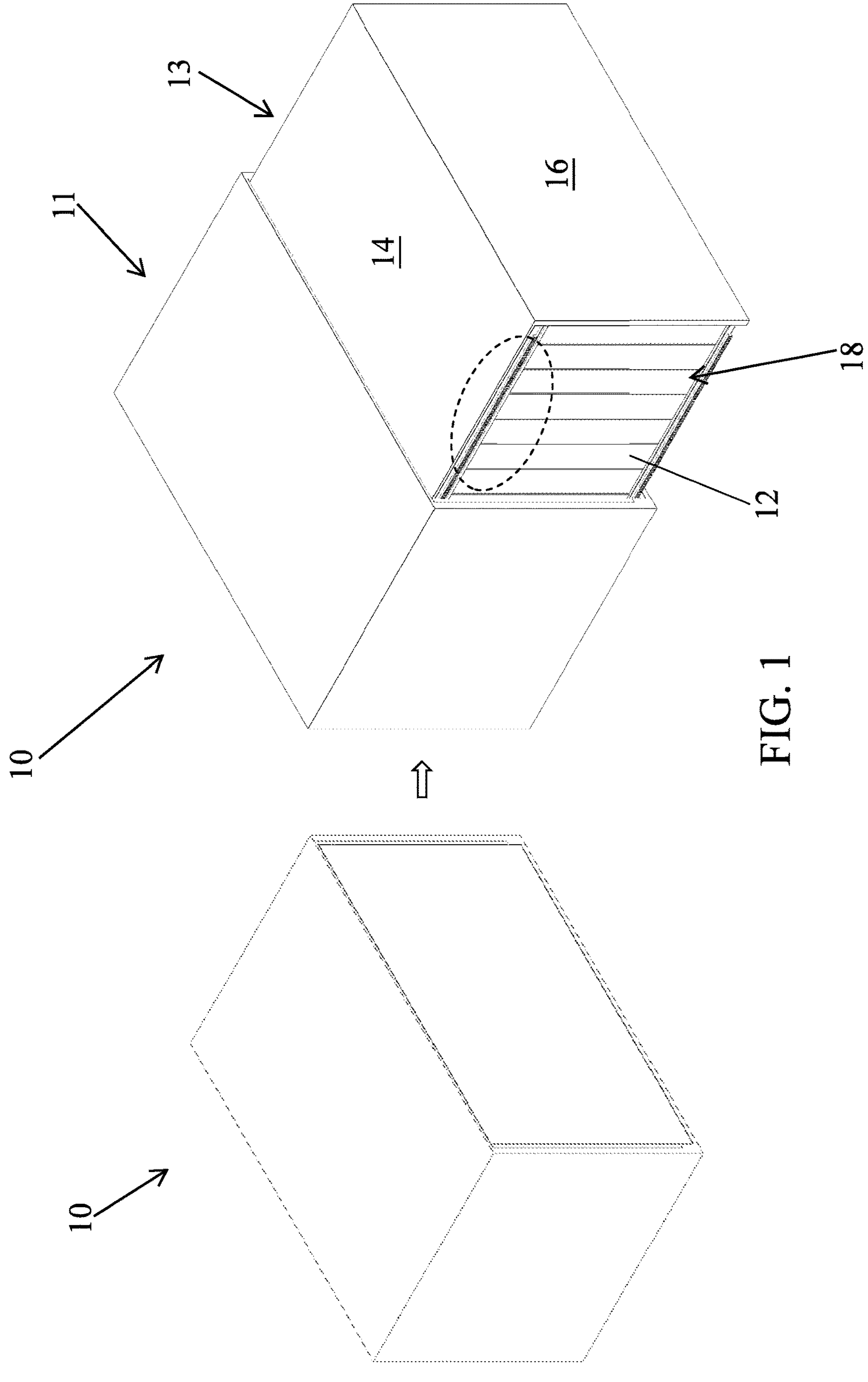
FIG. 1 illustrates a perspective view of an expandable structure converting from a collapsed state to an expanded state.

The illustrations in the figures may not necessarily be drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term “and/or” includes any and all combinations of one or more of the associated listed items. As used herein, the singular forms “a,” “an,” and “the” are intended to include the plural forms as well as the singular forms, unless the context clearly indicates otherwise. It will be further understood that the terms “comprises” and/or “comprising,” when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature (s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide an expandable structure having an expansion section with side wall panels that can stack into and be deployed from a wall enclosure central housing. A track can be deployed on the wall enclosure for facilitating the movement of wall panels into and out of the central housing. This innovative configuration not only enables efficient and accurate storage of each wall panel within the central enclosure but also concurrently serves as the foundational support structure for the cabin. After the wall panels are deployed and the structure is fully expanded, the wall panels can be tightened together to provide sound and weather protection.

Figure 2:
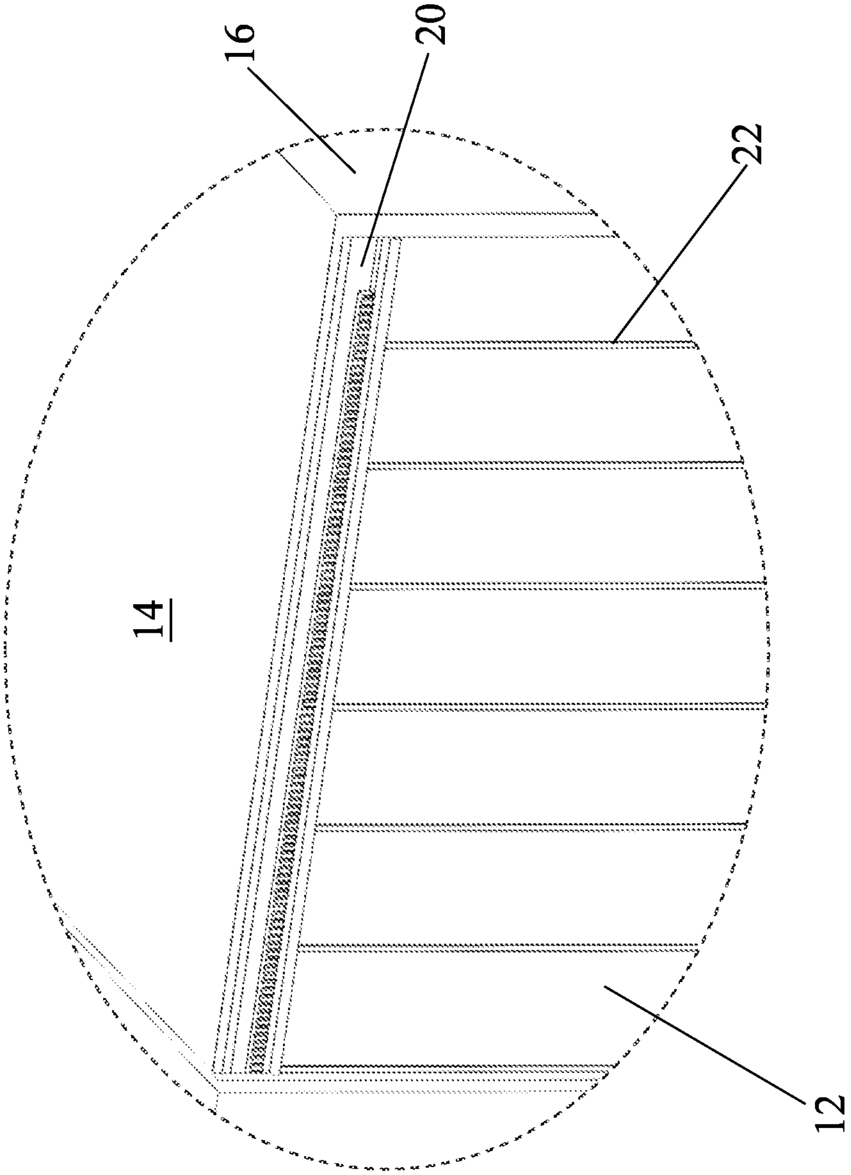
FIG. 2 illustrates a detailed view of a side wall and side wall track of the expandable structure of FIG. 1 in the expanded state with gaps between the wall panels of the side wall.
Figure 3:
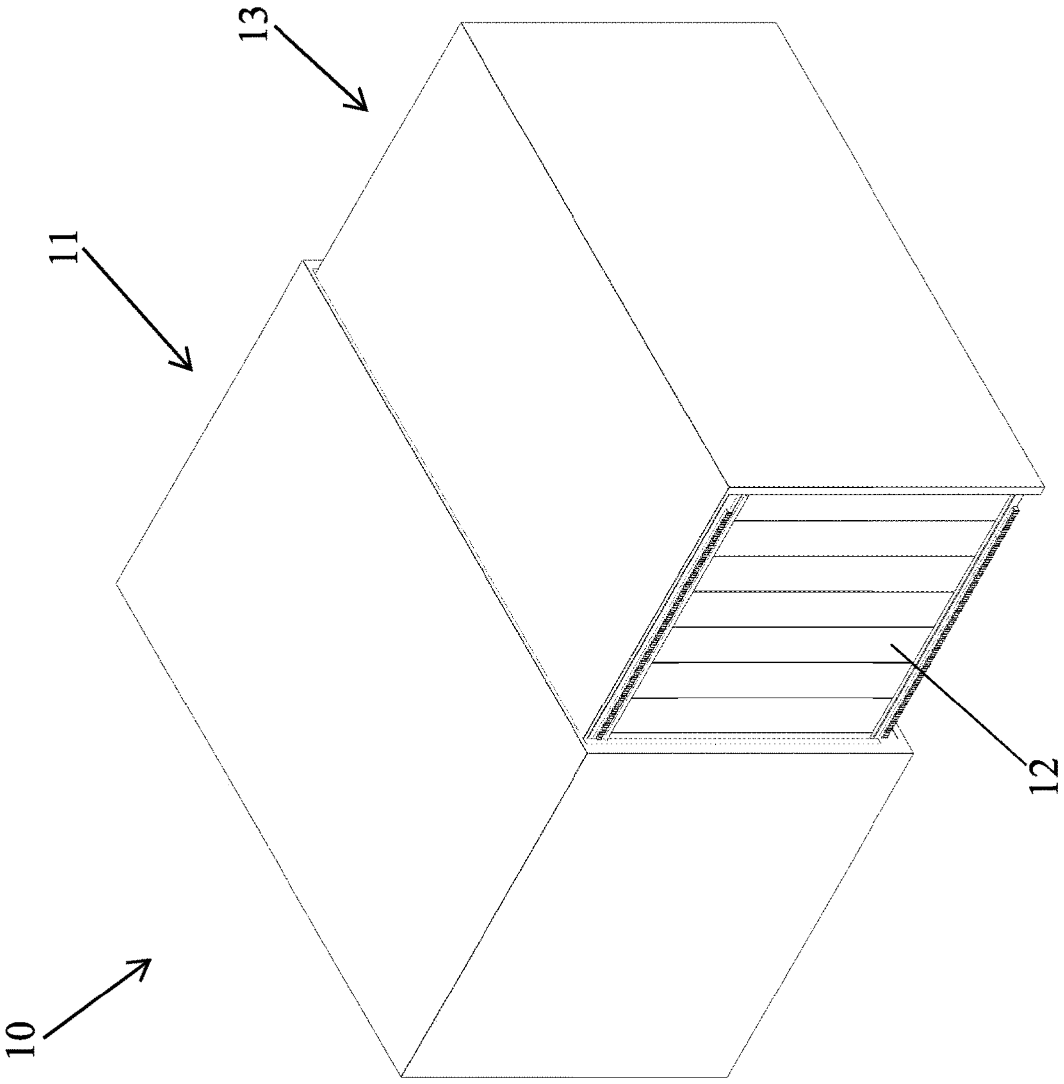
FIG. 3 illustrates a perspective view of the expandable structure in the expanded state, with the side wall tightened to eliminate the gaps between the wall panels of the side wall.

Referring to FIG. 1, an expandable structure 10 can be moved between a collapsed state/configuration and an expanded state/configuration. In the expanded state, the expandable structure 10 can include a main section 11 and an expansion section 13. The expansion section 13 can include an end wall 16, a roof 14 and a side wall 18 formed from a plurality of wall panels 12. As shown in the detail of FIG. 2, the wall panels 12 may be moved by a pair of (upper and bottom tracks both for actuation) sliding tracks 20, described in greater detail below. During and immediately after deployment of the expansion section 13, the wall panels 12 may include a gap 22 there between. As shown in FIG. 3, as discussed in greater detail below, once fully expanded, the expansion section 13 can retract, causing the wall panels 12 to be tightly pressed against each other, reducing or eliminating the gaps 22.

The wall deployment system, according to embodiments of the present invention, can be configured in a modular column shape when folded, thus achieving a large-scale extension without affecting external structures/surfaces. Some conventional expandable housing structures have side walls that are bucky and usually hinged around some pivots installed at the edges of the main housing structure. The wall deployment system, according to embodiments of the present invention, can achieve adaptive extension range (e.g., extend for 8 feet or only 2 feet out), making the extension of novel housing structure flexible. Further, by making the wall panels stacked in a column structure, the sacrifice of usable indoor space can be effectively avoided. The wall panel squeezing function, permitting gaps between the wall panels during deployment, can ensure smooth deployment during expansion while still maintain high level R-value of the side walls after the squeezing function is completed.

Figure 4:
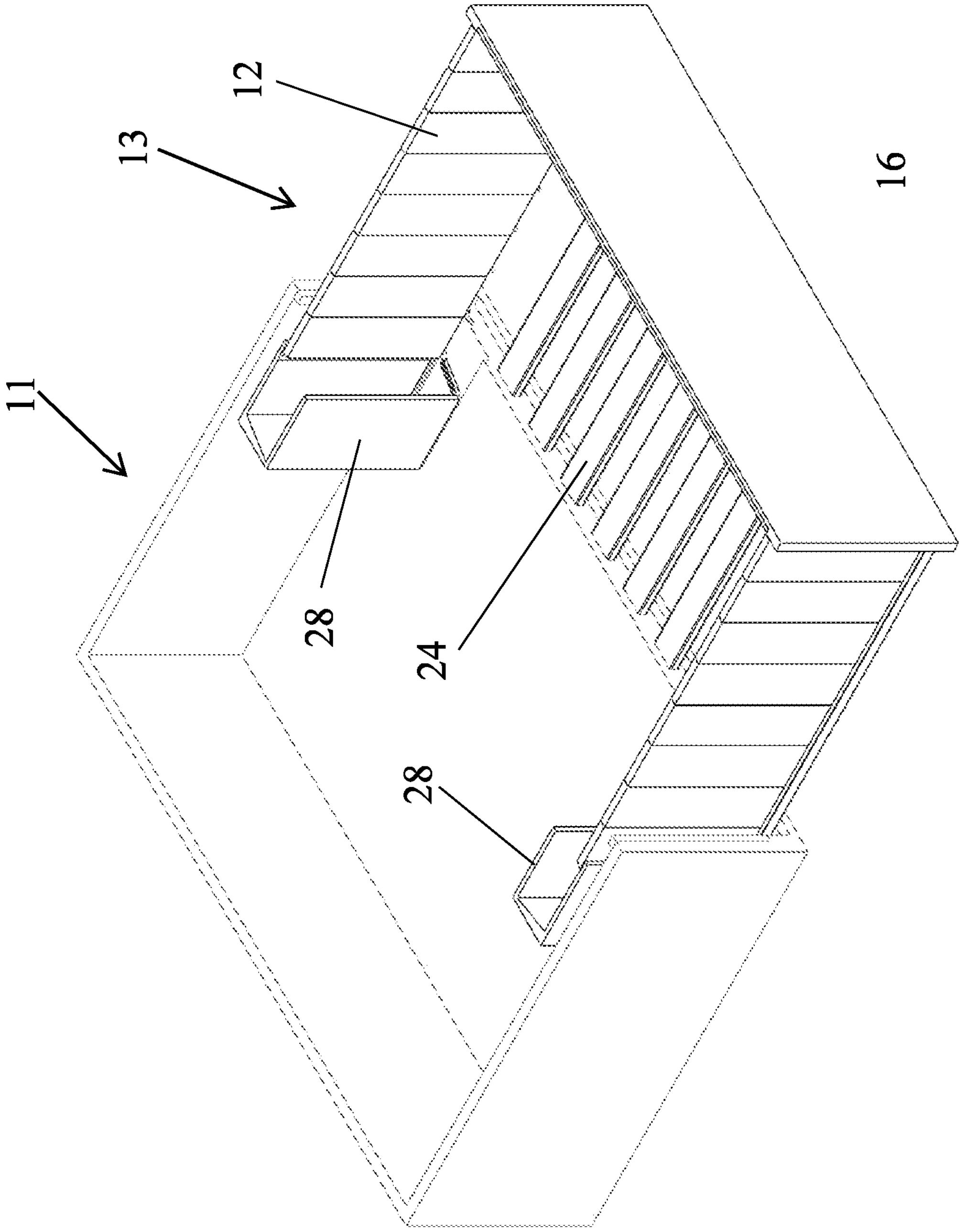
FIG. 4 illustrates a cut-away perspective view of the expandable structure in the expanded state with the floor portion removed.
Figure 5:
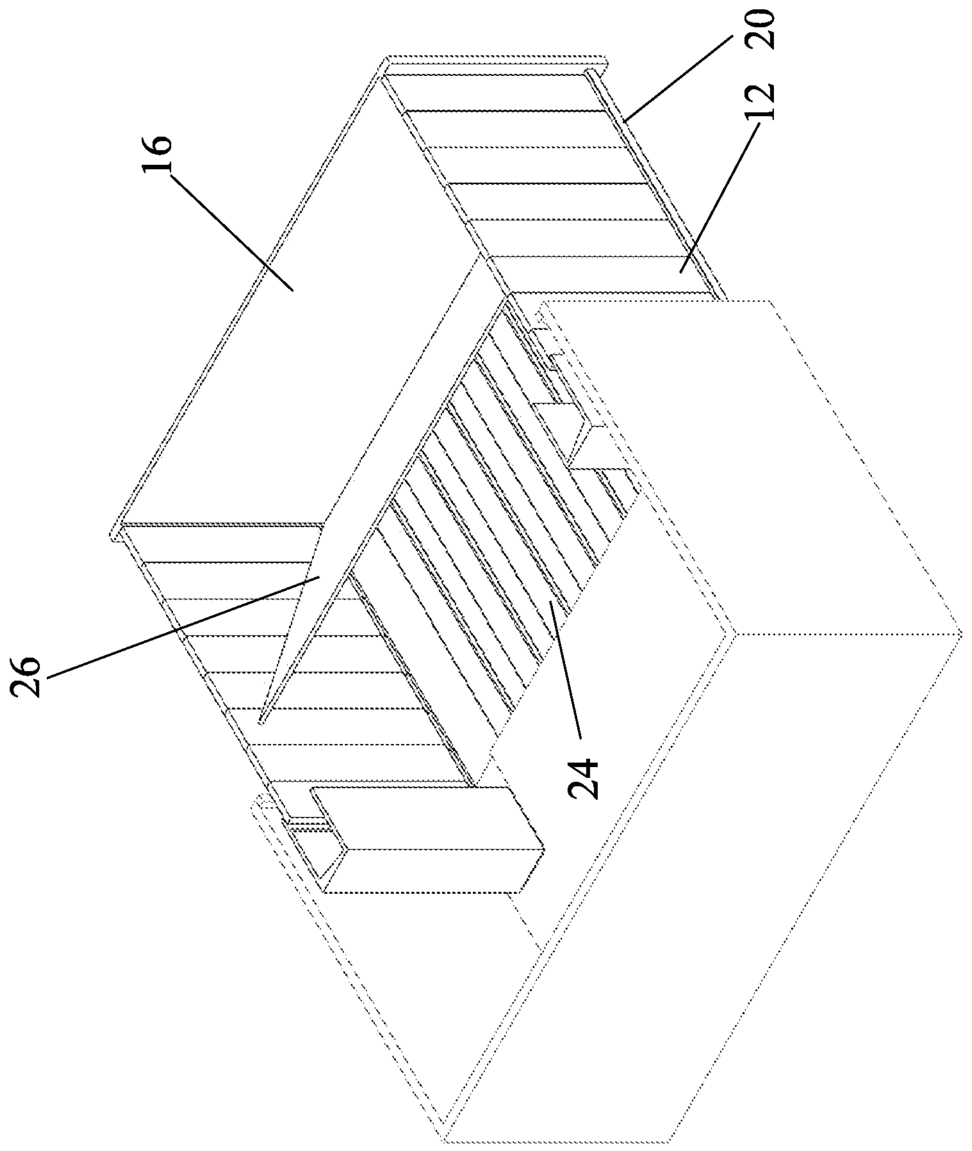
FIG. 5 illustrates a cut-away perspective view of the expandable structure in the expanded state with the floor portion moving into its deployed position.

Referring to FIGS. 4 and 5, a plurality of floor support panels 24 may be deployed from the main structure 11 after expansion. As shown in FIG. 5, a floor 26 can be positioned adjacent the outer wall 16 when in the collapsed state and the floor 26 can pivot downward to be supported by the plurality of floor support panels 24 when in the expanded state.

Figure 6:
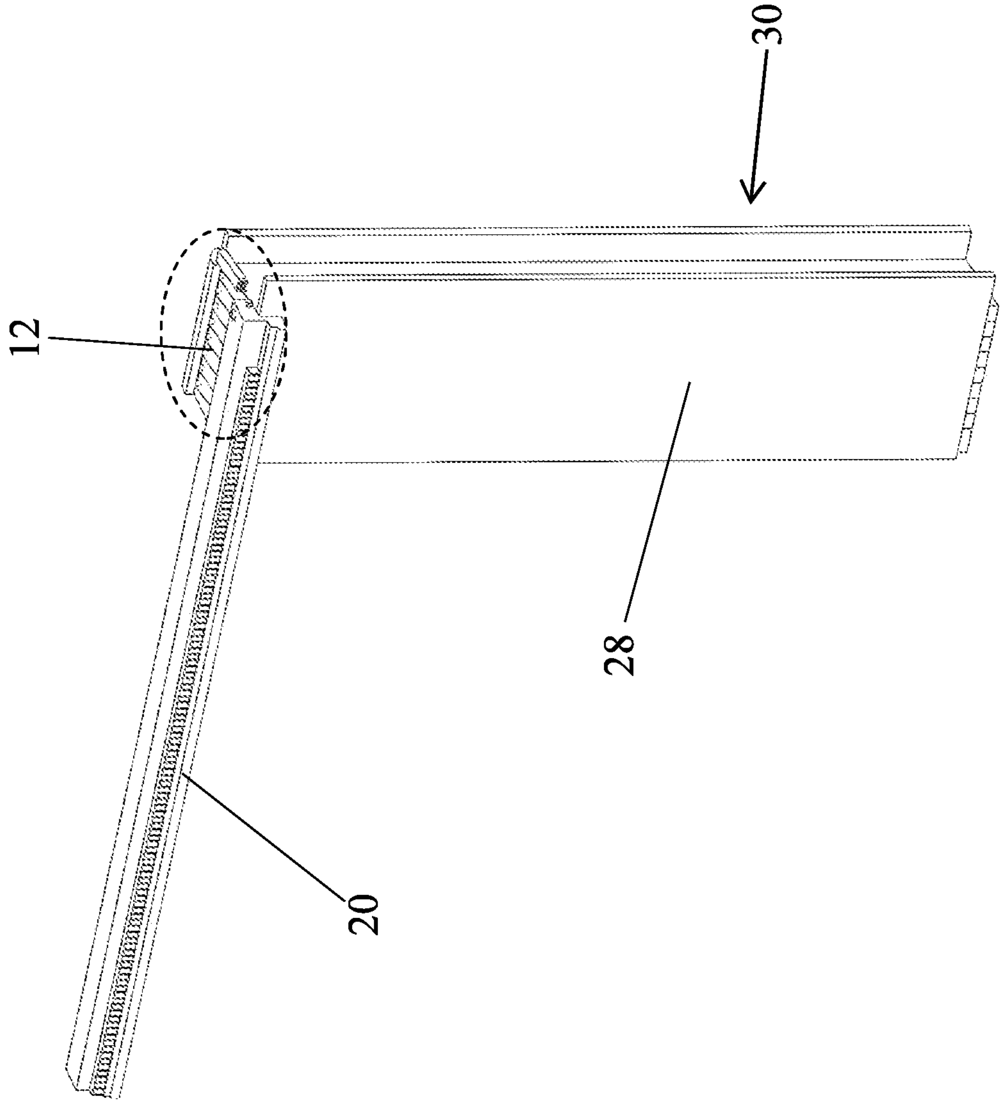
FIG. 6 illustrates the track and wall panel storage chamber of the expandable structure in the collapsed state.

As shown in FIG. 6, the wall panels 12 may be stored in a wall panel storage chamber 28, typically located in the main structure 11, and having an open end 30 facing toward the outer wall 16 (see FIG. 4). As described below, the sliding track 20 may move outward, in the expansion direction, moving with it the wall panels 12.

Figure 7:
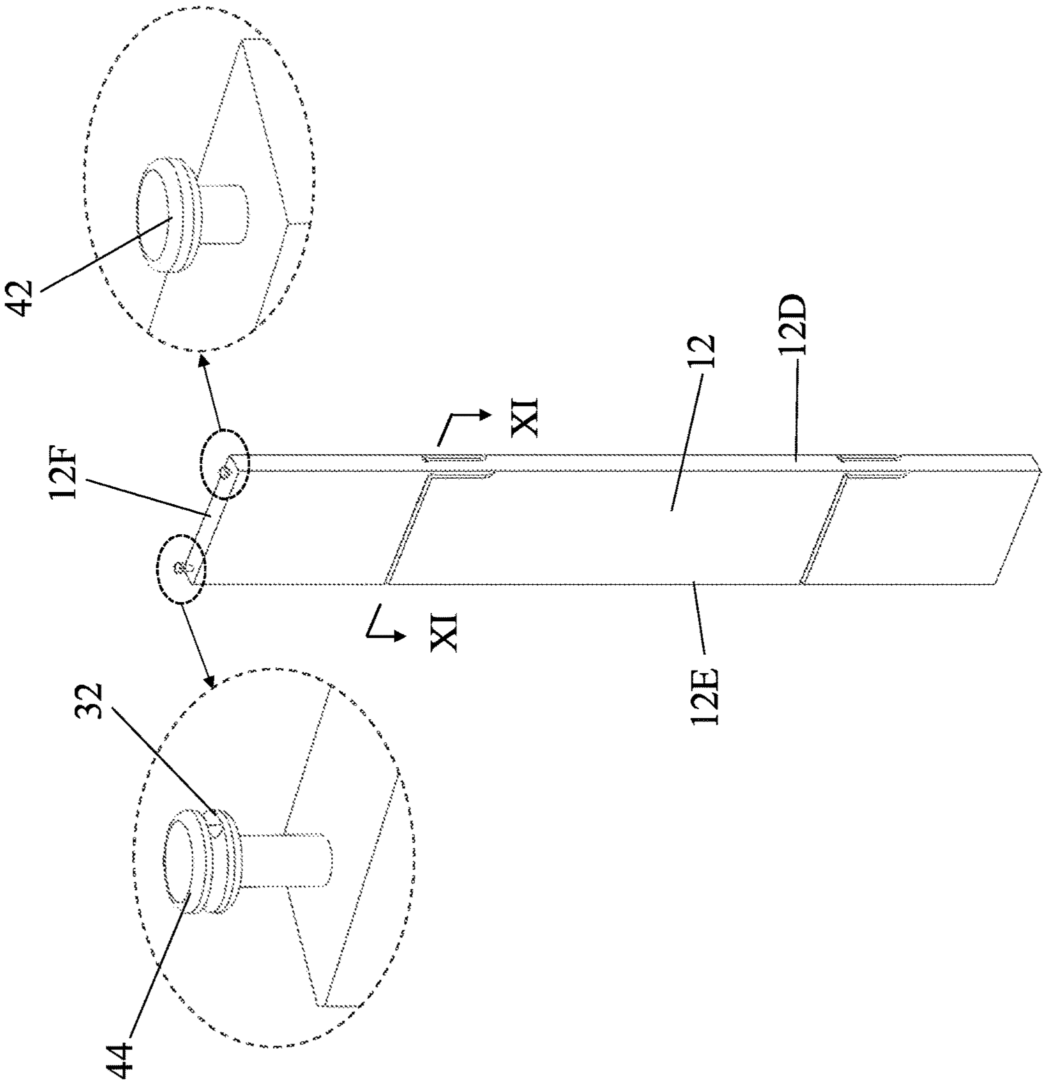
FIG. 7 illustrates a perspective view of a single wall panel of the side wall, illustrating the cable grooves designed on the wall panel, where this feature may be hidden in other figures for simplicity.

Referring to FIG. 7, each wall panel 12 can include a first pin 42 extending upward from the top surface 12F, adjacent a leading end 12D, of the wall panel 12. The first pin 42, as discussed below, is configured to move within a channel 38 (see FIG. 8B) of the sliding track 20. Each wall panel 12 can also include a second pin 44 extending upward from the top surface 12F, adjacent a trailing end 12E, of the wall panel 12. The second pin 44, as discussed below, is configured to move along a set of guides to move into and out of the sliding track 20. This permits the folding, stacking and storage of the wall panels 12 when in the collapsed state. The second pin 44 can also include a hole 32 therethrough for passing a cable that can be used to assist in the retraction of the wall panels 12 during the collapsing process. The second pin 44 can have a height that is greater than that of the first pin 42.

As used herein, the leading end 12D refers to the end of the wall panel 12 that leads during expansion of the expansion section 13. The trailing end 12E, is the end that is closer to the main section 11 after expansion. When collapsed, the leading ends 12D of each wall panel 12 may be directed toward the exterior of the structure. After expansion, the leading ends 12D may be directed toward the outer wall 16.

Figure 8B:
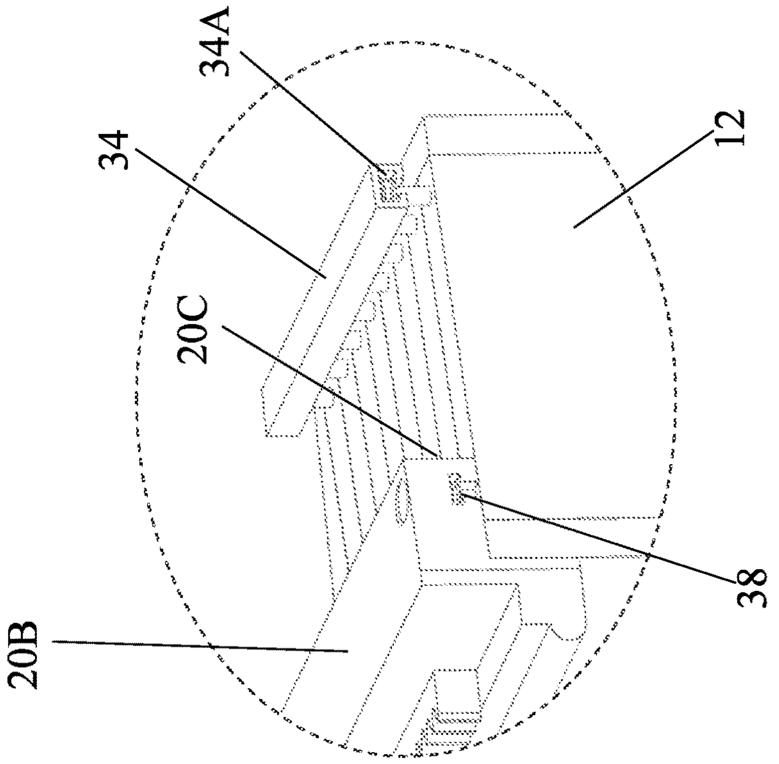
FIG. 8B illustrates a cross-sectional view of the detailed view of FIG. 8A.
Figure 8A:
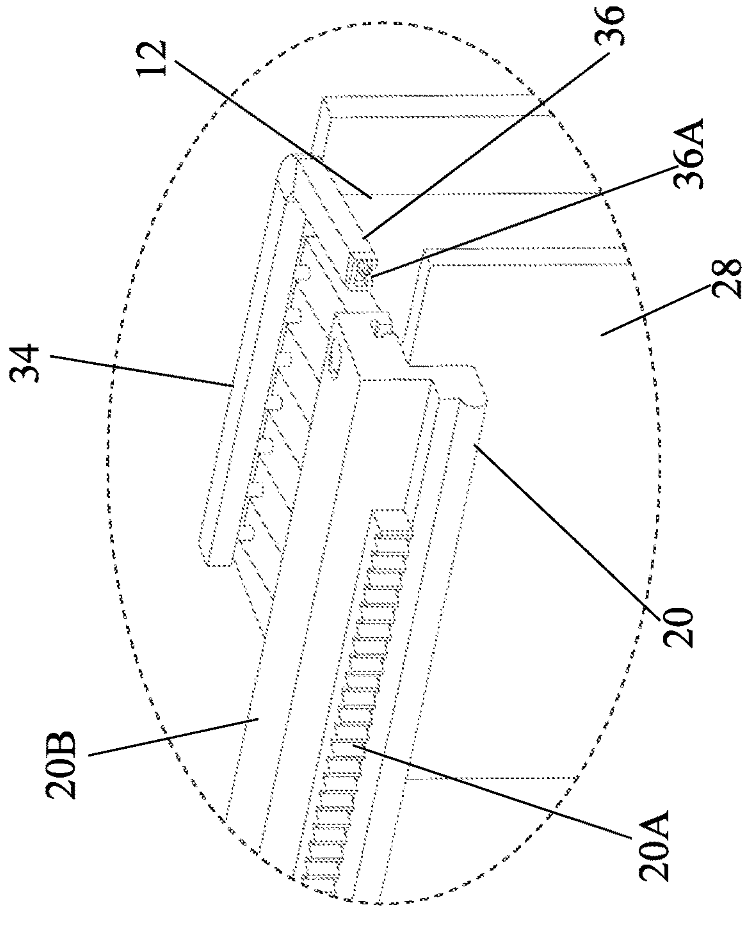
FIG. 8A illustrates a detailed view of the wall panels stored in the wall panel storage chamber.

Referring to FIGS. 8A and 8B, the wall panels 12 are shown in the collapsed state, where the sliding track 20 houses the first pin 42 within channel 38 formed along an upper body portion of the sliding track 20. The second pin 44 of each wall panel 12 is housed within a channel 34A of a first guide 34, where the first guide 34 extends generally parallel to the longitudinal axis of the track 20. A second guide 36 can have a channel 36A that communicates with the channel 34 A of the first guide 34 and extends to an inner edge 20C of the sliding track 20. The first guide 34 is generally orthogonal to (or forms an obtuse angle of 91 to 150 degrees, for example, with) the second guide 36. The sliding track 20 can include teeth 20A, for example, on its outer surface. The teeth 20A can interact with a rack and pinion system (not shown) within the main structure to drive the sliding track 20. Of course, other movement mechanisms, such as hydraulic, screw drive, or the like, may be used to move the sliding track.

While the figures focus on the sliding track 20 and the associated structures at the top, front of the structure 10, a similar structure is present at the bottom front, the top rear and the bottom rear of the structure 10, thus providing four structures that can operate to move the expansion section between the expanded and collapsed states. FIG. 1, for example, shows two of the sliding tracks 20 on the front of the structure 10.

Figure 9:
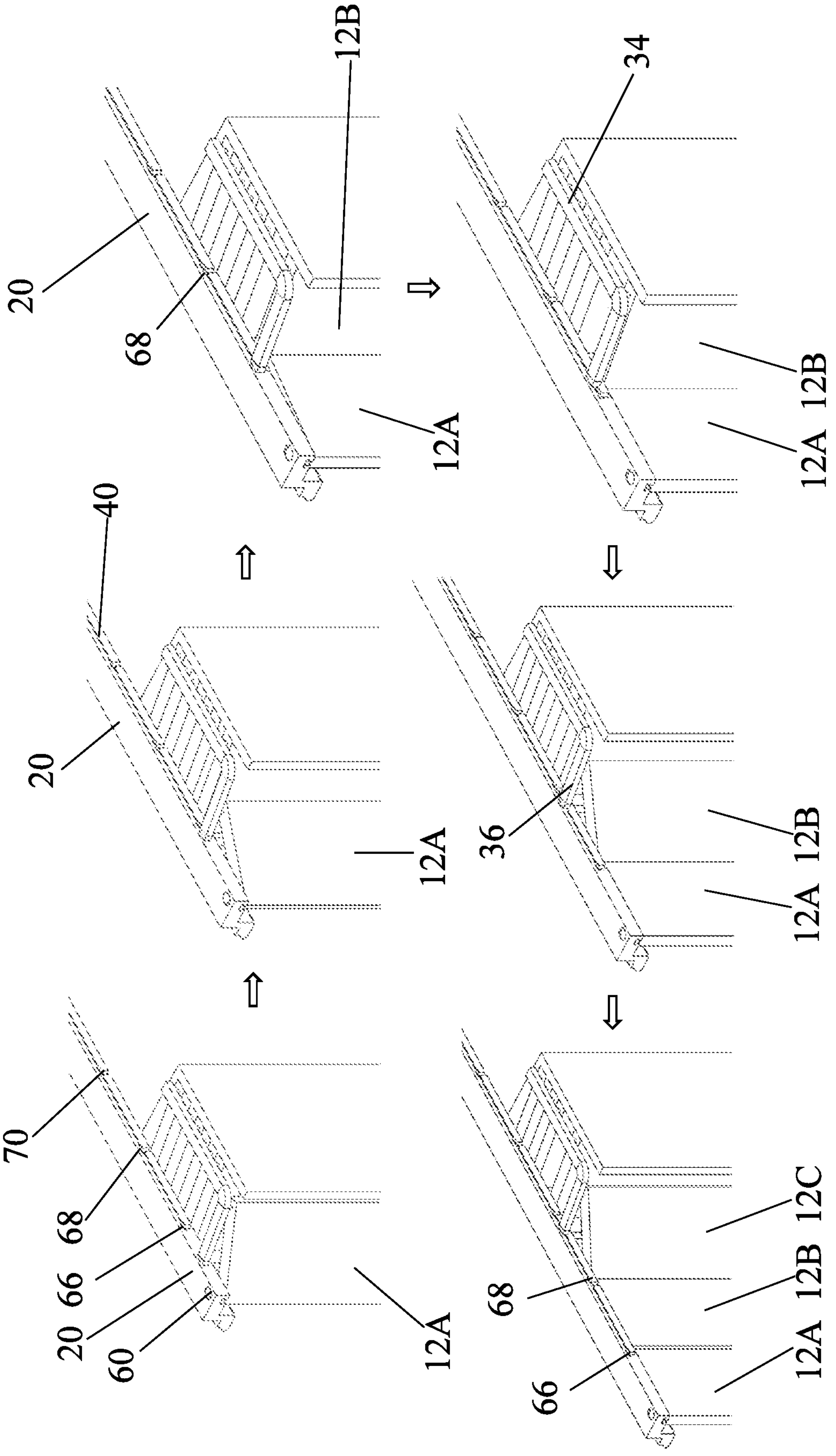
FIG. 9 illustrates a detailed perspective view of the wall panels being deployed out of the wall panel storage chamber.

Referring to FIG. 9, the deployment of the wall panels 12 is illustrated. In the first image, at the upper left, a first wall panel 12A has its first pin 42 fixed to the sliding track 20. The sliding track 20 moves, causing the second pin 44 of first wall panel 12A to move from the first guide 34 into the second guide 36. The second image shows the first wall panel 12A moving along the second guide 36 as the sliding track 20 is further extended. In the third image (upper right), the first wall panel 12A is about to be received by a first receiving section 66 of the sliding track 20. The first receiving section 66 can be open to the inner edge 20C of the sliding track 20 to permit movement of the second pin 44 from the second guide 36 into the first receiving section 66. The fourth image (bottom right) shows the first wall panel 12A fully within the sliding track 20 and a second wall panel 12B being moved by the moving track 20 (as shown in the fifth image), as the second pin 44 of the second wall panel 12B moves along the second guide 36 toward the inner edge 20C of the sliding track 20. As shown in the last image (bottom left), the second wall panel 12B has its second pin 44 within a second receiving section 68 of the sliding track 20 and a third wall panel 12C is moved along the second guide 36 to move its second pin 44 into the third receiving section 70 of the sliding track 20. A groove 40 is provided for housing a cable that interconnects each of the all panels 12 through the hole 32 of the second pin 44, as described below.

Figure 10:
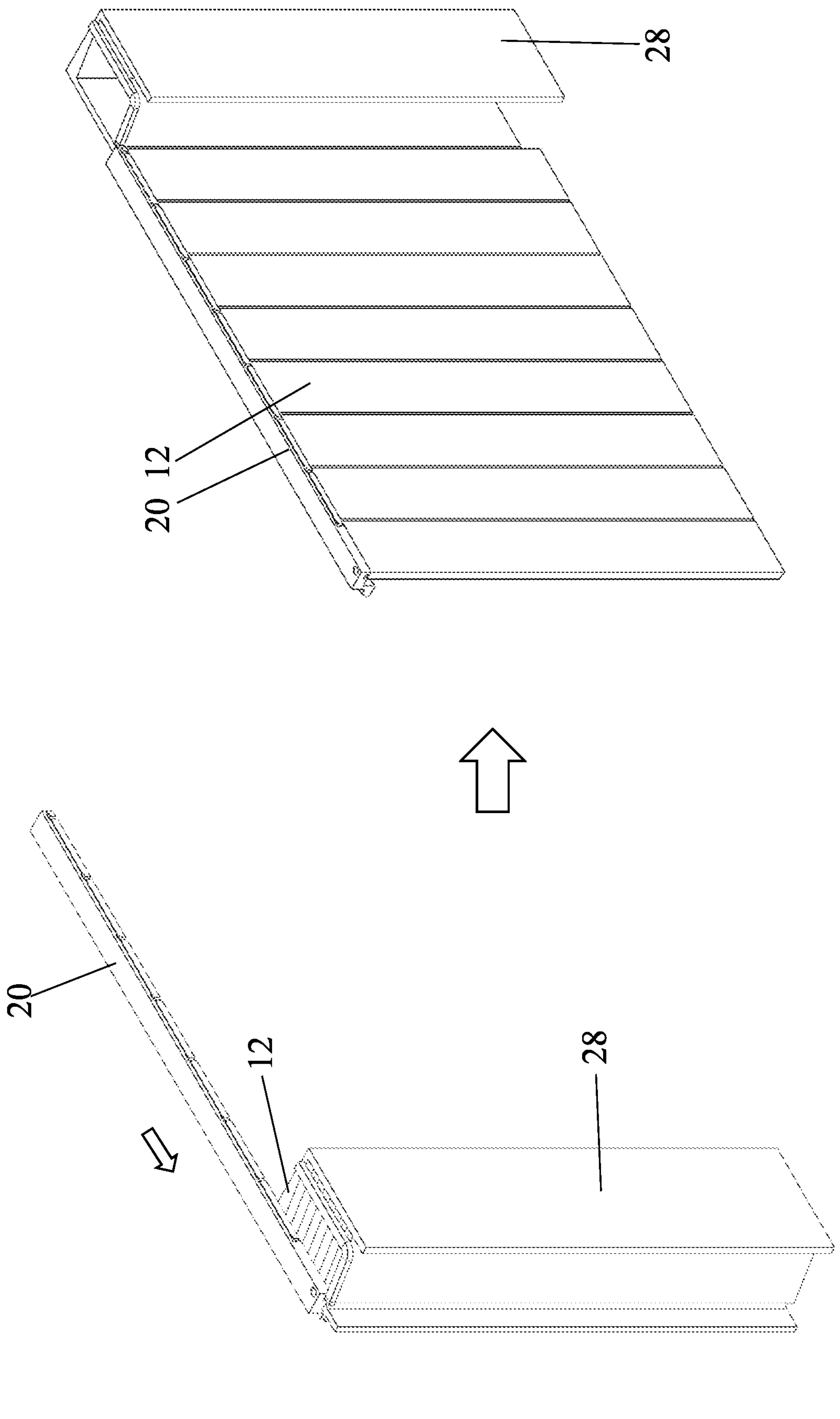
FIG. 10 illustrates a transition of the side wall from the collapsed state to the expanded state.
Figure 11:
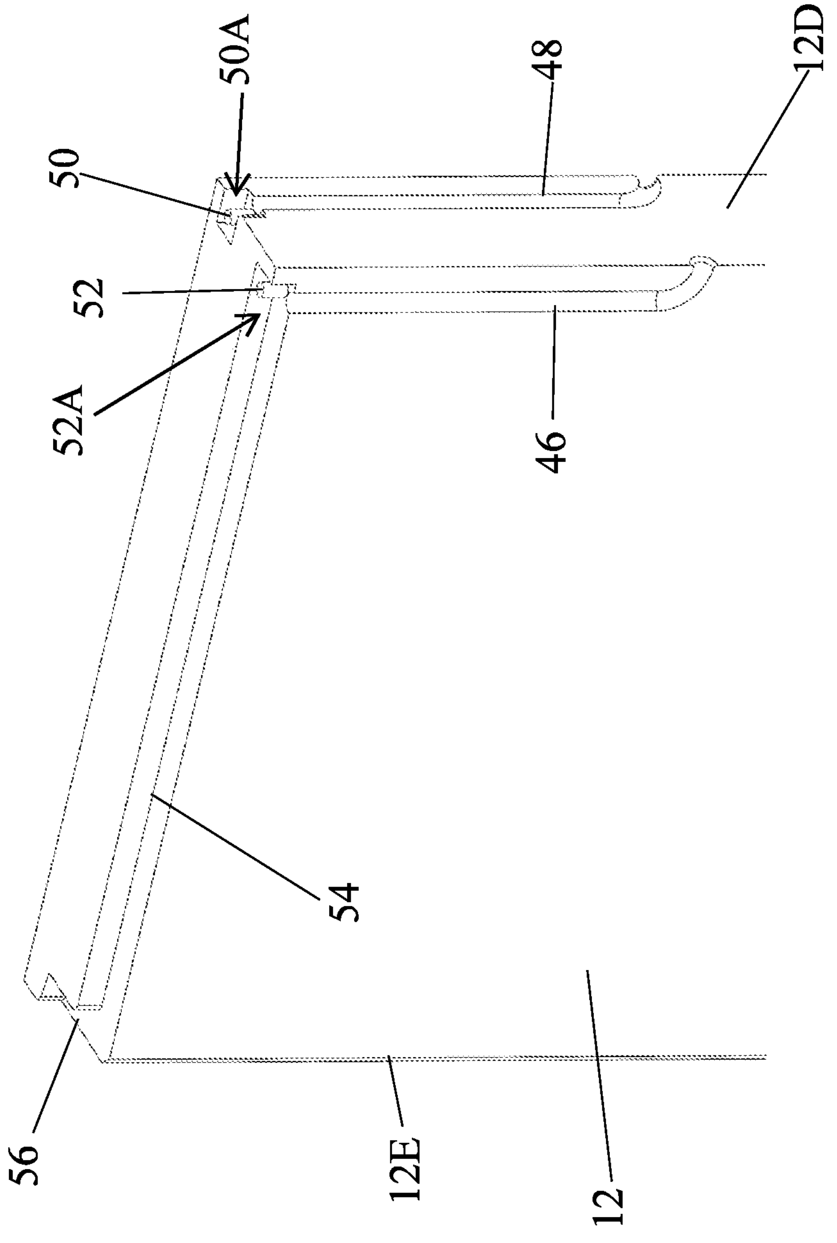
FIG. 11 illustrates a cross-sectional view of a wall panel taken along line XI-XI of FIG. 7.

FIG. 10 shows the movement of the sliding track 20 from the collapsed state to the expanded state. Once in the expanded state, the wall panel that is closest to the main structure can be fixed in its position and the sliding tracks 20 can be moved inward (toward the main structure) to squeeze the wall panels together, providing enhanced insulation properties. This aspect is further discussed in greater detail below.

Referring now to FIGS. 11 through 15, as discussed above a cable, such as cable 58 (see FIG. 13B) may be used to interconnect the wall panels 12 along a central portion thereof. In some embodiments, as shown in the figures, two portions of the wall panels 12 may be joined by a similar cabling structure. The upper one of these cabling structures are described herein, where the lower one of the cabling structures would include similar features. In place of the two cabling structures, as shown, a single central cabling structure may be used.

The cabling structure can include a first anchor point 52 that may be located in a recessed region 52A positioned toward an exterior thereof. The recessed region 52A can communicate with the exterior of the wall panel 12 and with a first downward extending recessed region 46. The downward extending recessed region 46 can also communicate with an exterior face of the wall panel, as shown. A second anchor point 50 can be located in a recessed region 50A positioned toward an interior of the wall panel. The recessed region 50A can communicate with the leading end 12D of the wall panel 12 and with a second downward extending recessed region 48. The second downward extending recessed region 48 can then communicate with an interior face of the wall panel 12, as shown.

The recessed region 52A can communicate with a vertical recessed region 54 that extends across the exterior face of the wall panel 12 and communicates with a trailing edge recessed region 56, where the trailing edge recessed region 56 communicates with the trailing end 12E of the wall panel 12.

Figure 12A:
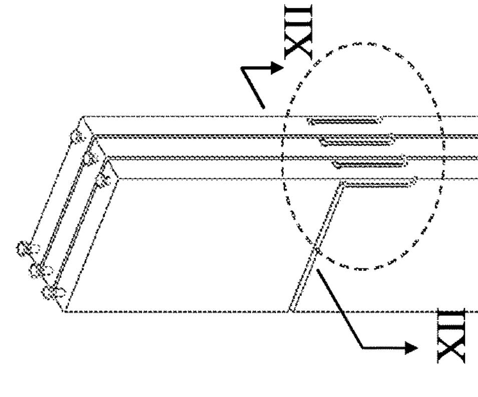
FIG. 12A illustrates a plurality of stacked wall panels with cables and cable grooves displayed.
Figure 12B:
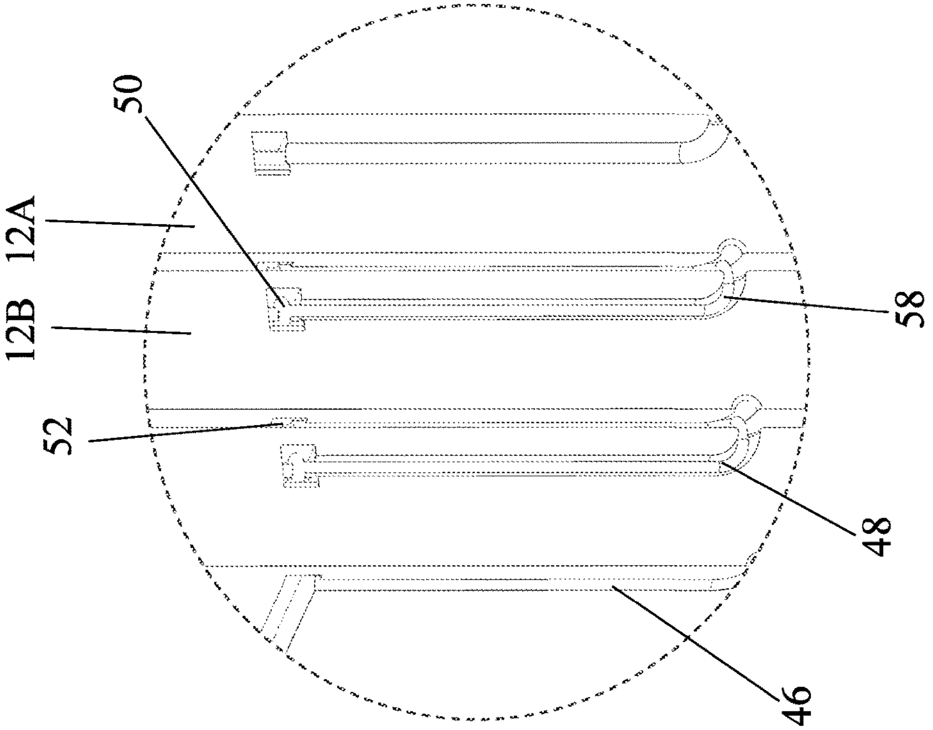
FIG. 12B illustrates a detailed view of an end of the stacked wall panels.
Figure 12C:
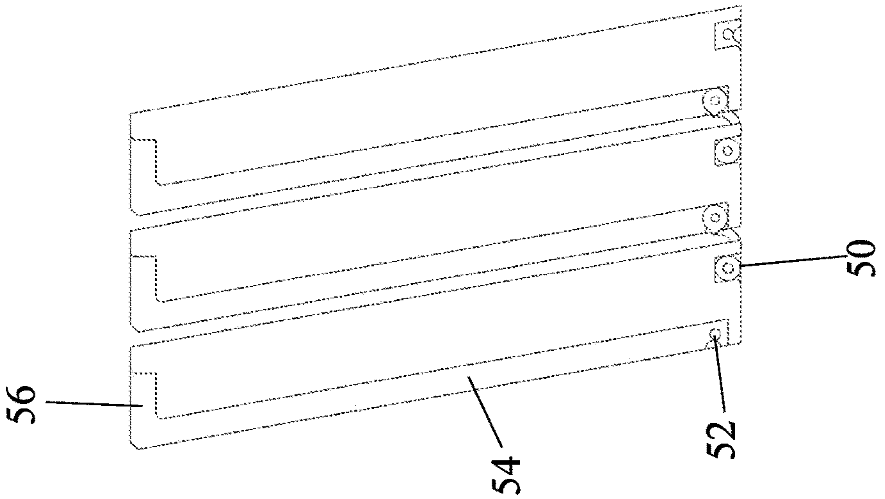
FIG. 12C illustrates a cross-sectional view of stacked wall panels taken along line XII-XII of FIG. 12A.
Figure 13A:
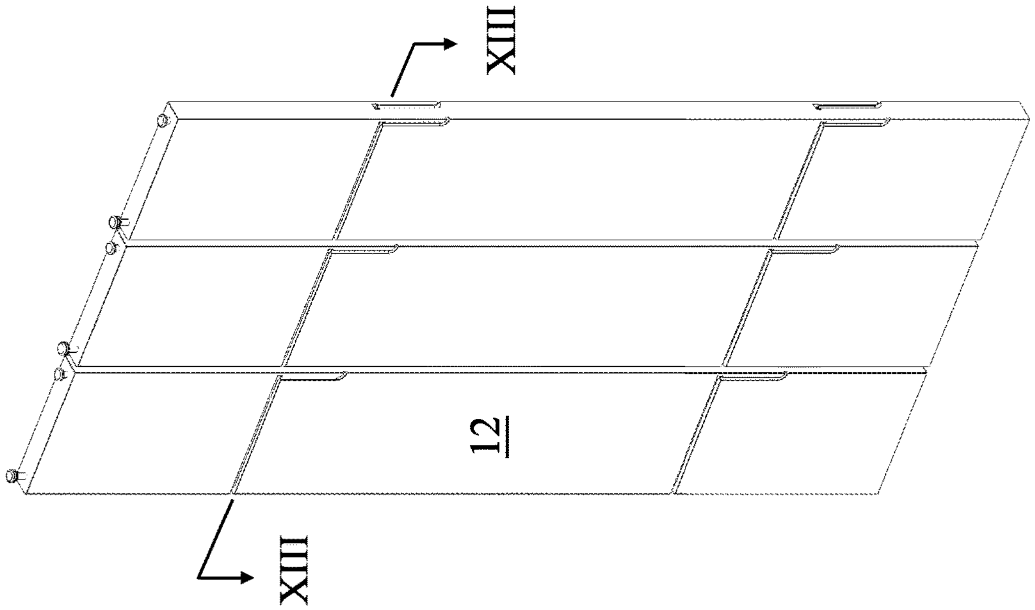
FIG. 13A illustrates a plurality of expanded wall panels.
Figure 13B:
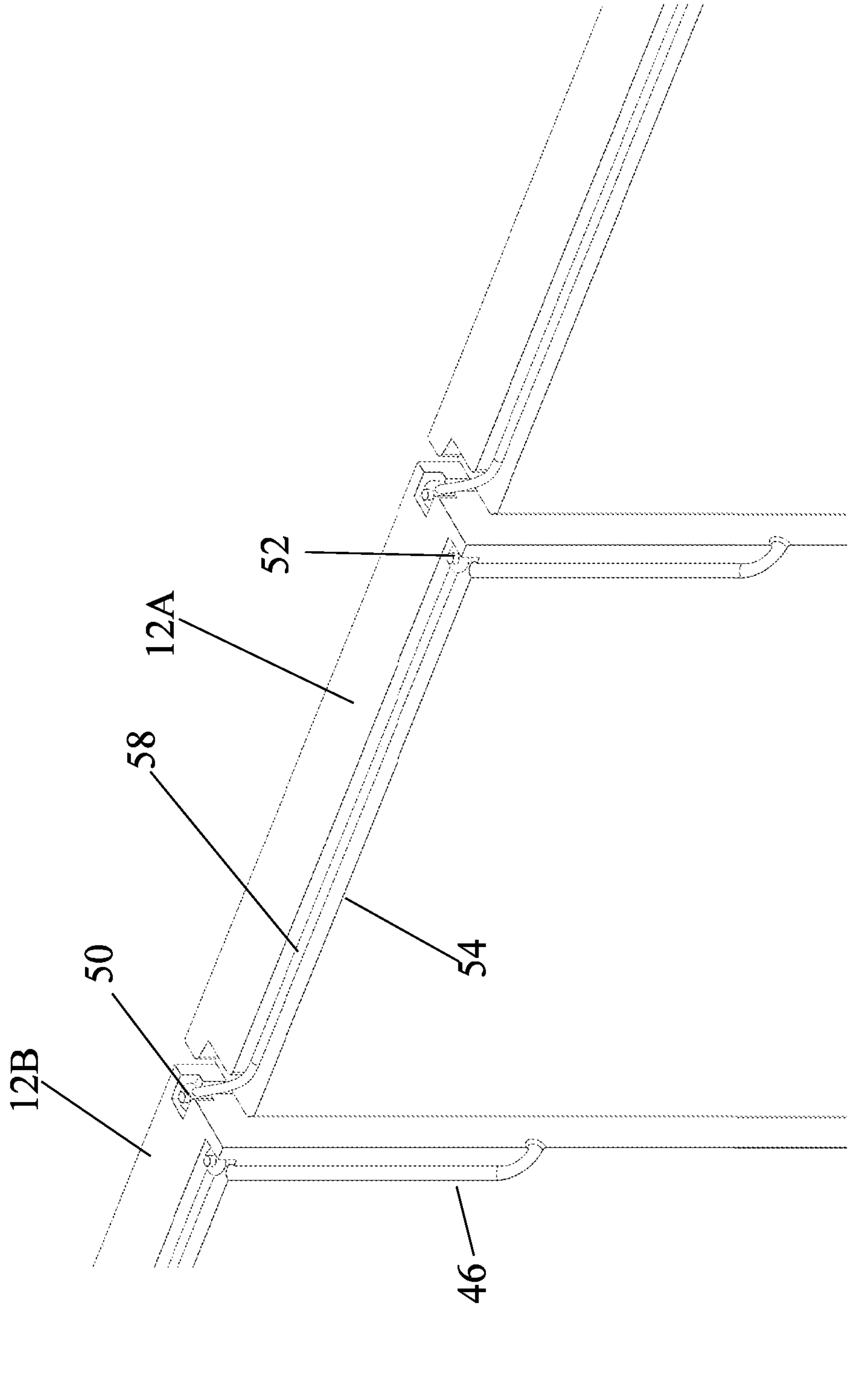
FIG. 13B illustrates a cross-sectional view of the plurality of expanded wall panels taken along line XIII-XIII of FIG. 13.

When the wall panels 12 are in the collapsed state, as shown in FIGS. 12A through 12C, the cable 58 can extend from the first anchor point 50 of a leading wall panel 12A (the leading wall panel 12A being one that leads when the wall is deployed), down the second downward extending recessed region 48, into the lower part of the first downward extending recessed region 46 of a next wall panel 12B, up the first downward extending recessed region 46 to anchor at the second anchor point 52 of the next wall panel 12B. Each of the all panels 12 can be interconnected in this manner.

Figure 14A:
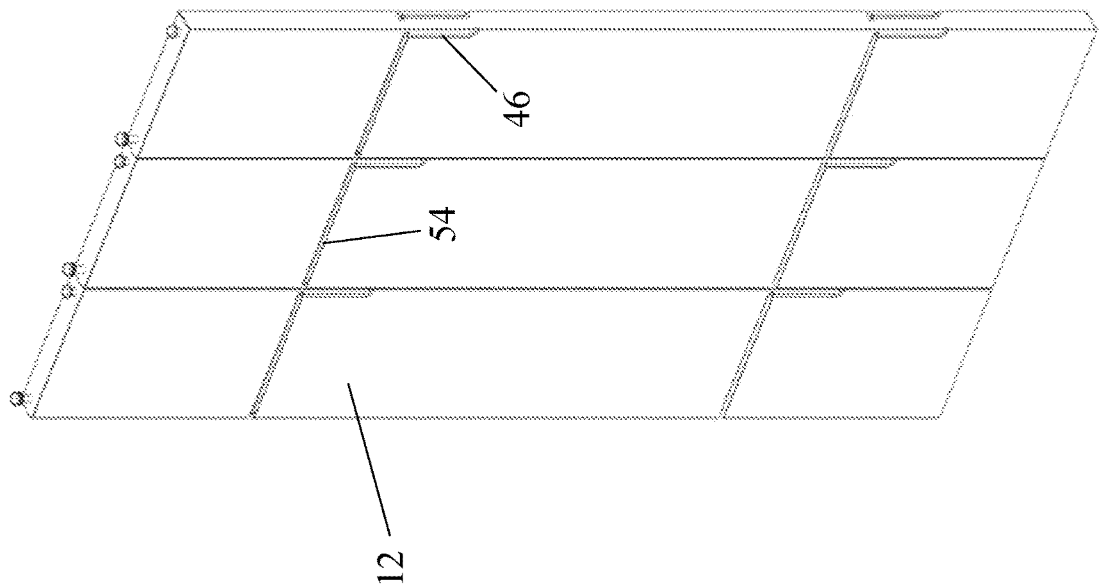
FIG. 14A illustrates a plurality of expanded wall panels squeezed together.
Figure 14B:
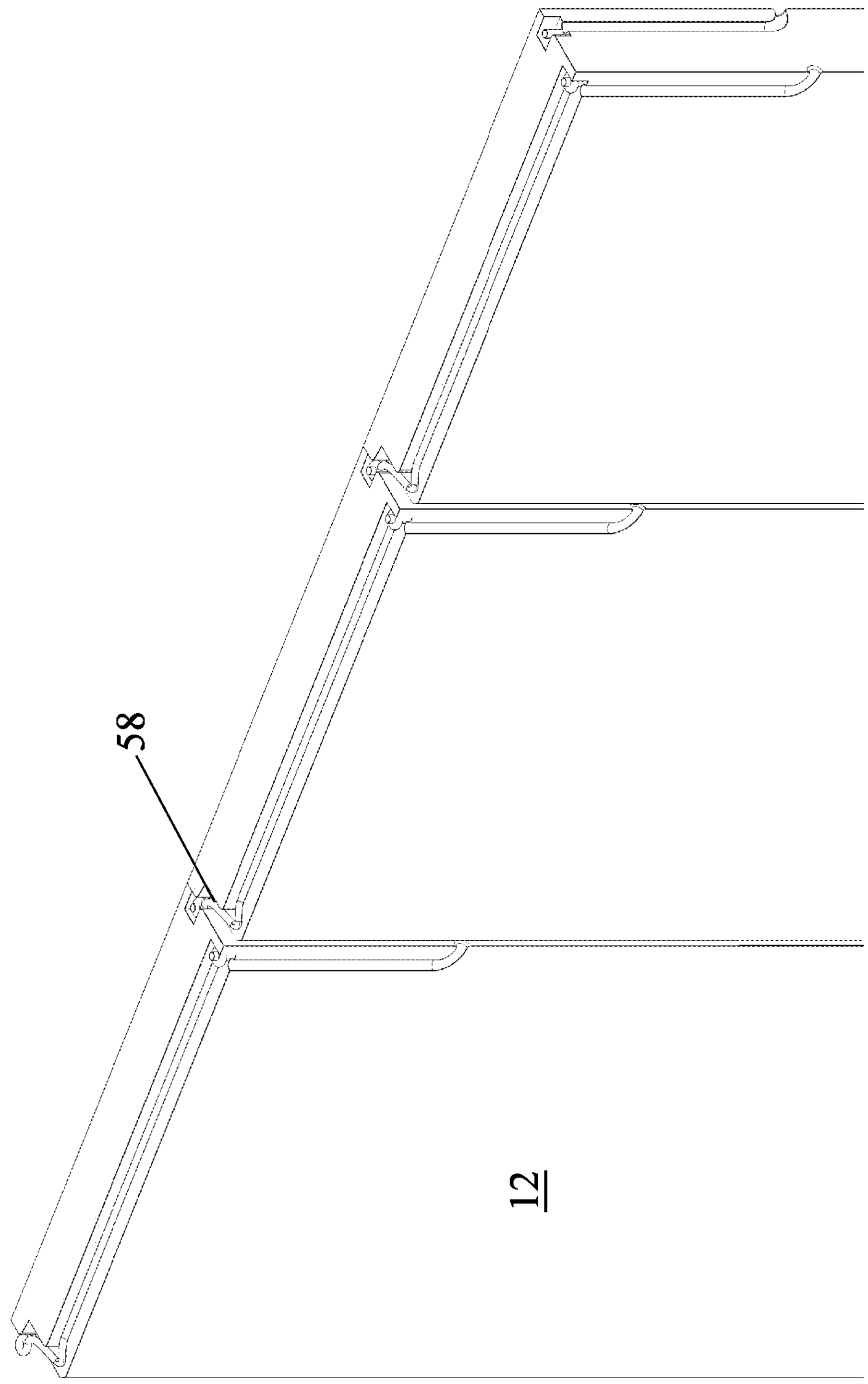
FIG. 14B illustrates the cross-sectional view of the plurality of expanded wall panels after tightening to bring the wall panels together.

When the wall panels are in the expanded state, as shown in FIGS. 13A through 14B, the cable 58 can move to extend from the first anchor point 52 of the leading wall panel 12A, along the vertical recessed region 54, out through the trailing edge recessed region 56 to connect to the second anchor point 50 of the next wall panel 12B. Thus, as the first wall panel is pulled out by the sliding track 20, the following wall panels can follow this first one along the sliding track 20, as discussed above. FIGS. 14A and 14B shows the wall panels after they are squeezed together as discussed above, by sliding the sliding track 20 back toward the main structure. In some embodiments, heat and sound insulative materials may be disposed between the wall panels 12 and may be squeezed together during the process of squeezing the walls together, thus providing further sound and weather insulation.

Figure 15:
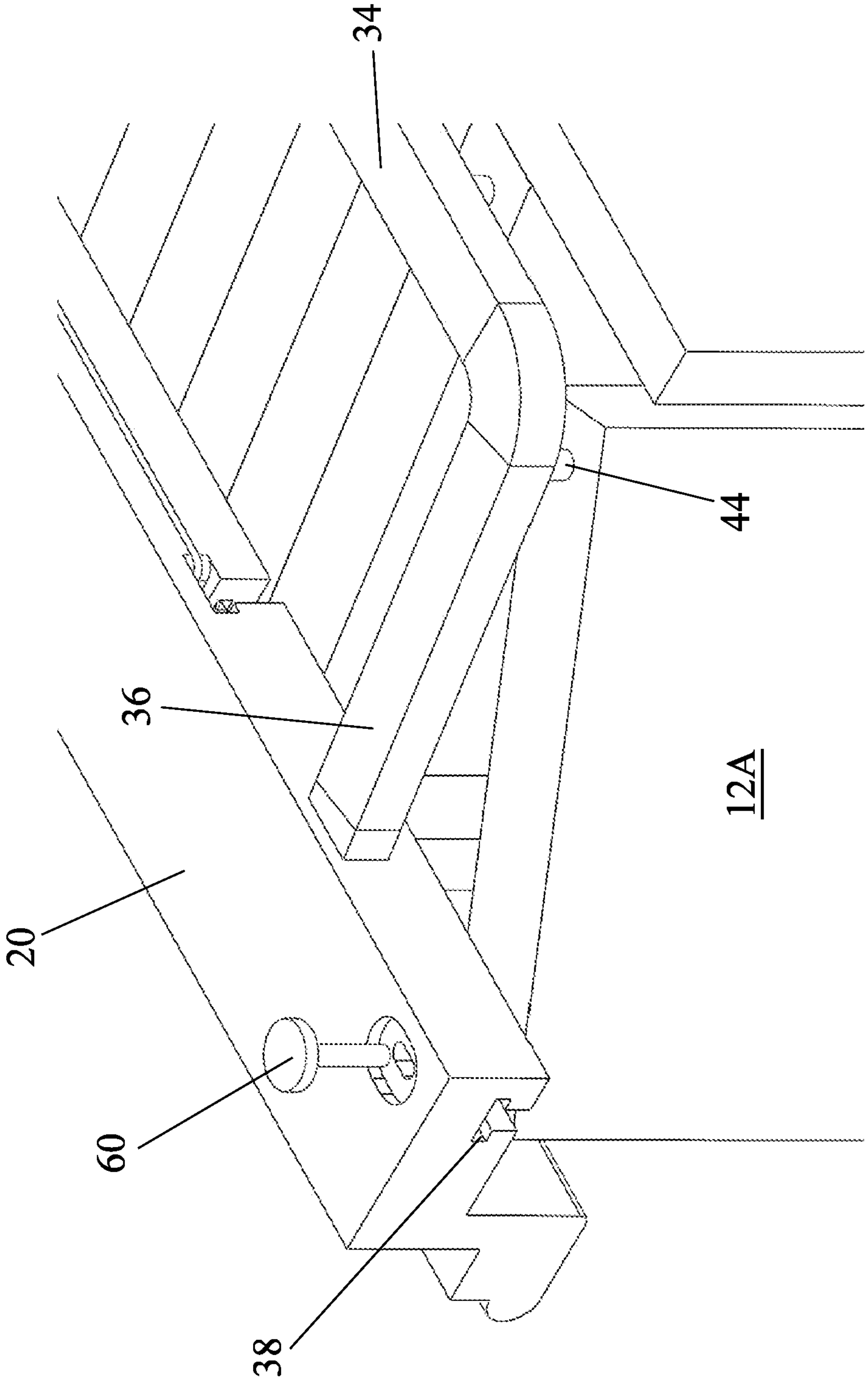
FIG. 15 illustrates a detailed view showing locking of a first wall panel within a track.
Figure 16:
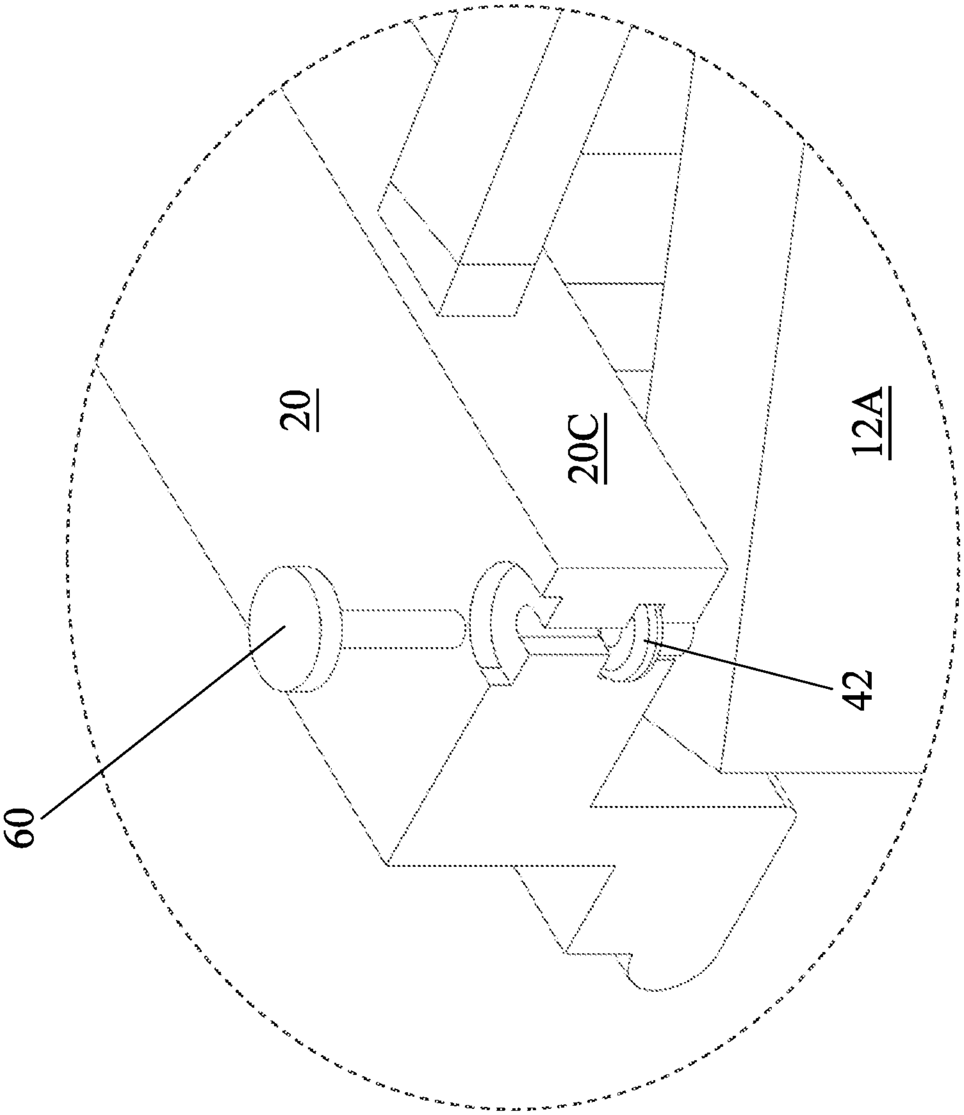
FIG. 16 illustrates a cross-sectional view showing locking of the first wall panel within the track.

FIGS. 15 and 16 illustrate how the first/leading wall panel 12A is fixed to the sliding track 20. In some embodiments, a pin 60 may be inserted through the top of the sliding track 20 to engage with the leading wall panel 12A. For example, the pin 60 may insert into the first pin 42 of the leading wall panel 12A. In this manner, the leading wall panel 12A may readily be rotatable about an axis defined by the first pin 42. The pin 60 may secure the pin 42 on the track 20, but the pin 60 may be configured to make slight movement within the U-slot on top of the track 20 to ensure smooth deployment of the wall panels.

Figure 17:
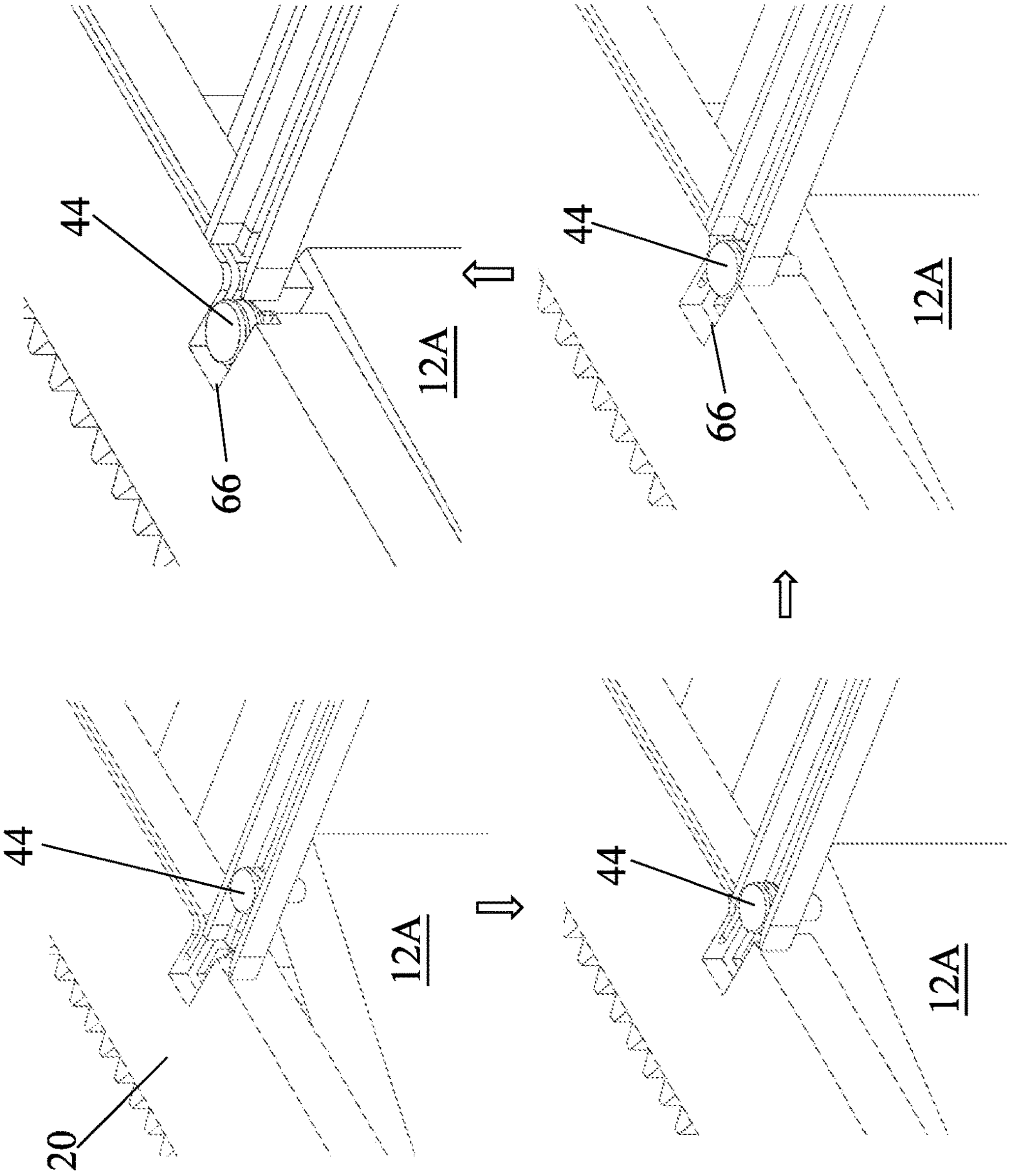
FIG. 17 illustrates a partially cut-away view showing deployment of the stacked wall panels into the track.
Figure 18:
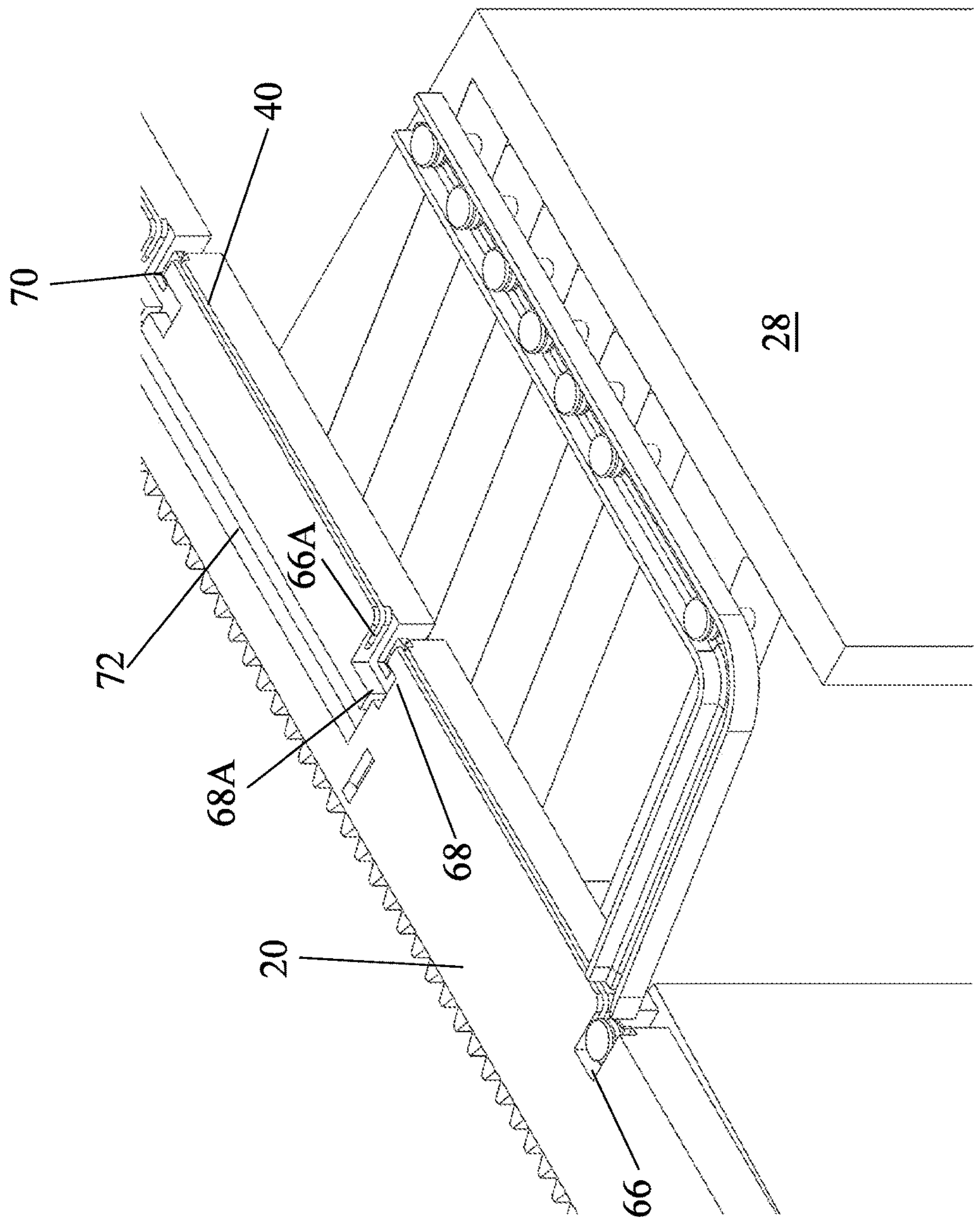
FIG. 18 illustrates a partially cut-away view showing the first wall panel being fully positioned within the track.
Figure 19:
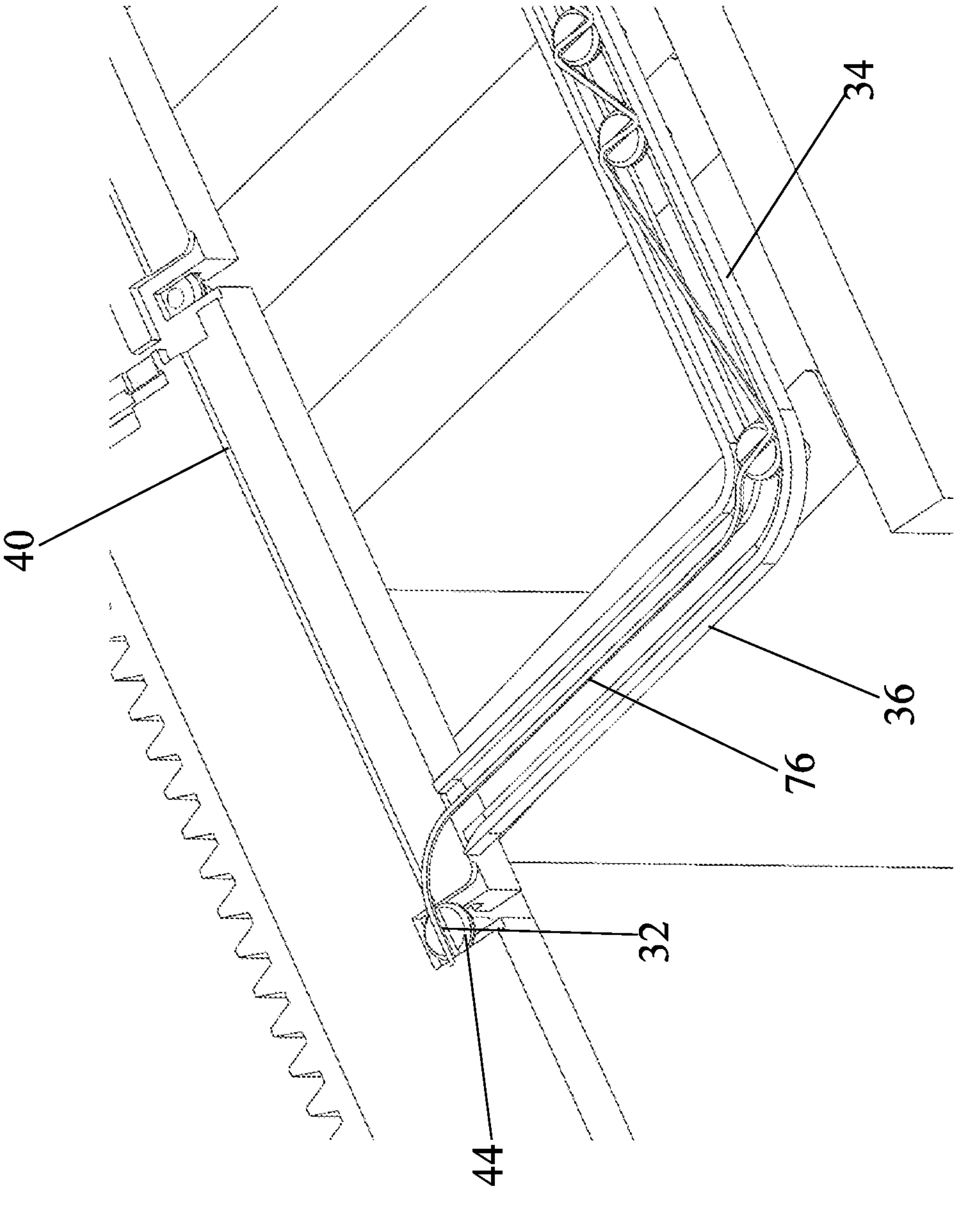
FIG. 19 illustrates a partially cut-away view showing a cord interconnecting each of the plurality of wall panels.

Referring to FIGS. 17 through 19, additional details showing the movement of the wall panels 12 (such as the leading wall panel 12A) from the guides 34,36 into the sliding track 20 is shown. In FIG. 17, the stepwise progression of the second pin 44 into the first receiving section 66 of the sliding track 20 is shown. In these figures, the top of the guides 34, 36 are removed for clarity. FIGS. 18 and 19 show how the cable 76 may pass through the hole 32 in the second pin 44 and connect between each of the pins 44 of adjacent ones of the wall panels 12. As the wall panels 12 have their second pins 44 placed into the respective ones of the receiving sections (such as receiving sections 66, 68, 70) of the sliding track 20, the cable 76 may be disposed along the groove 40. The cable 76 may be fixed to the second pin 44 of the leading wall panel 12A, so that, during retraction toward the collapsed state, periodical pulling of the cable 76 can pull in the closest wall panel, then the next closest, and the like until the leading wall panel 12A is pulled in, thus assisting in the collapsing of the wall panels 12 into the wall panel storage chamber 28 (described above).

Figure 20:
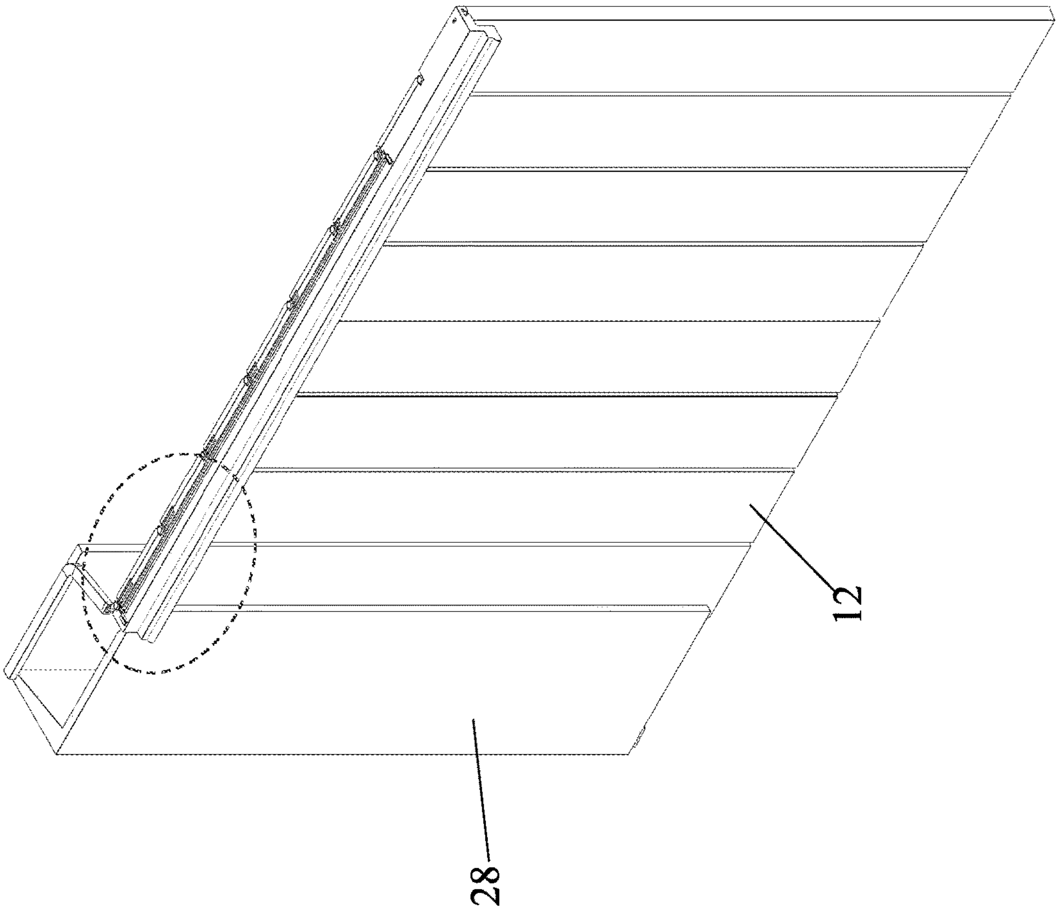
FIG. 20 illustrates a partially cut-away view showing the side wall in a fully expanded state with a locking structure embedded in the tracker activated.
Figure 21:
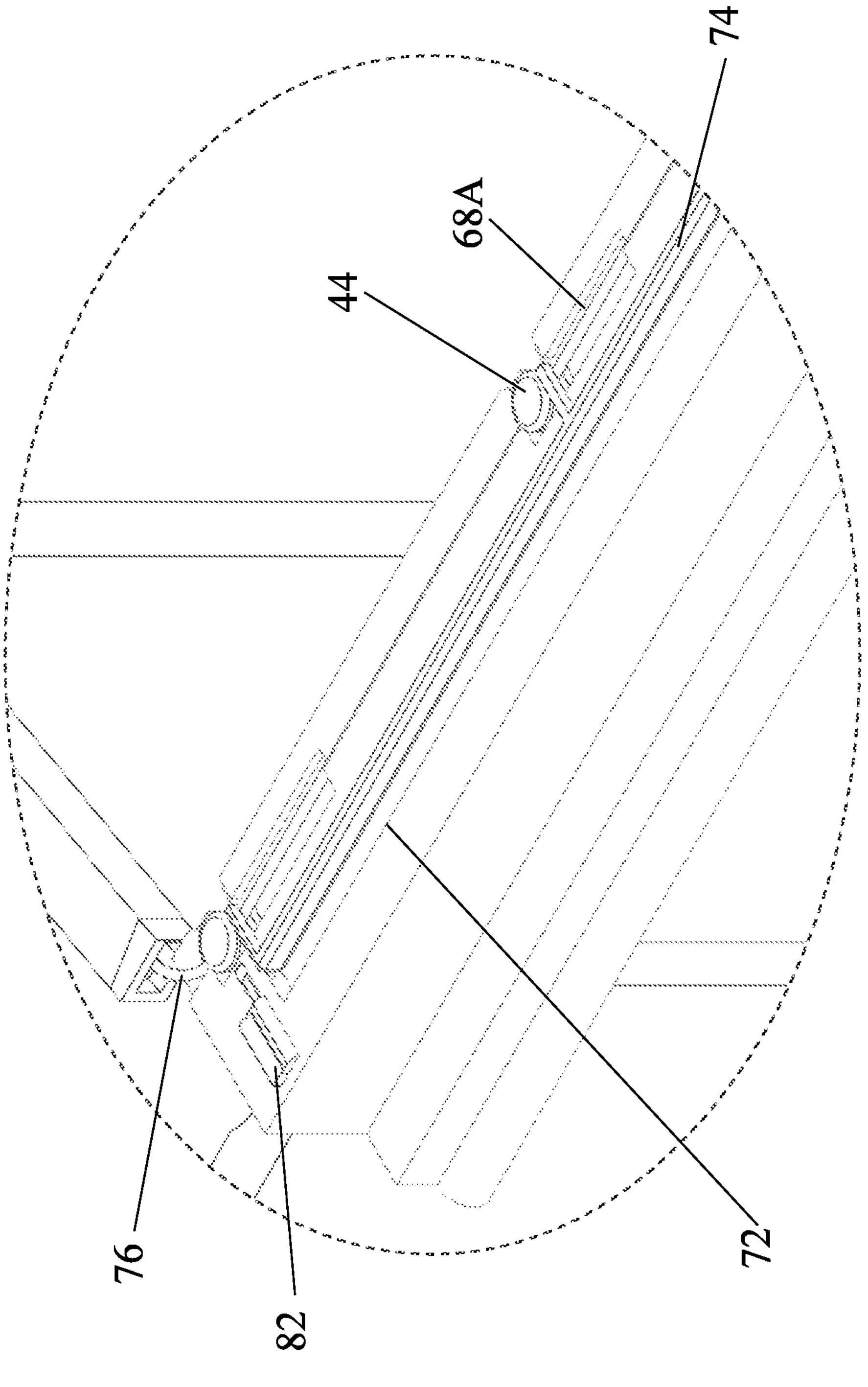
FIG. 21 illustrates a detailed view showing the connecting cord arrangement between the expanded wall panels.
Figure 22:
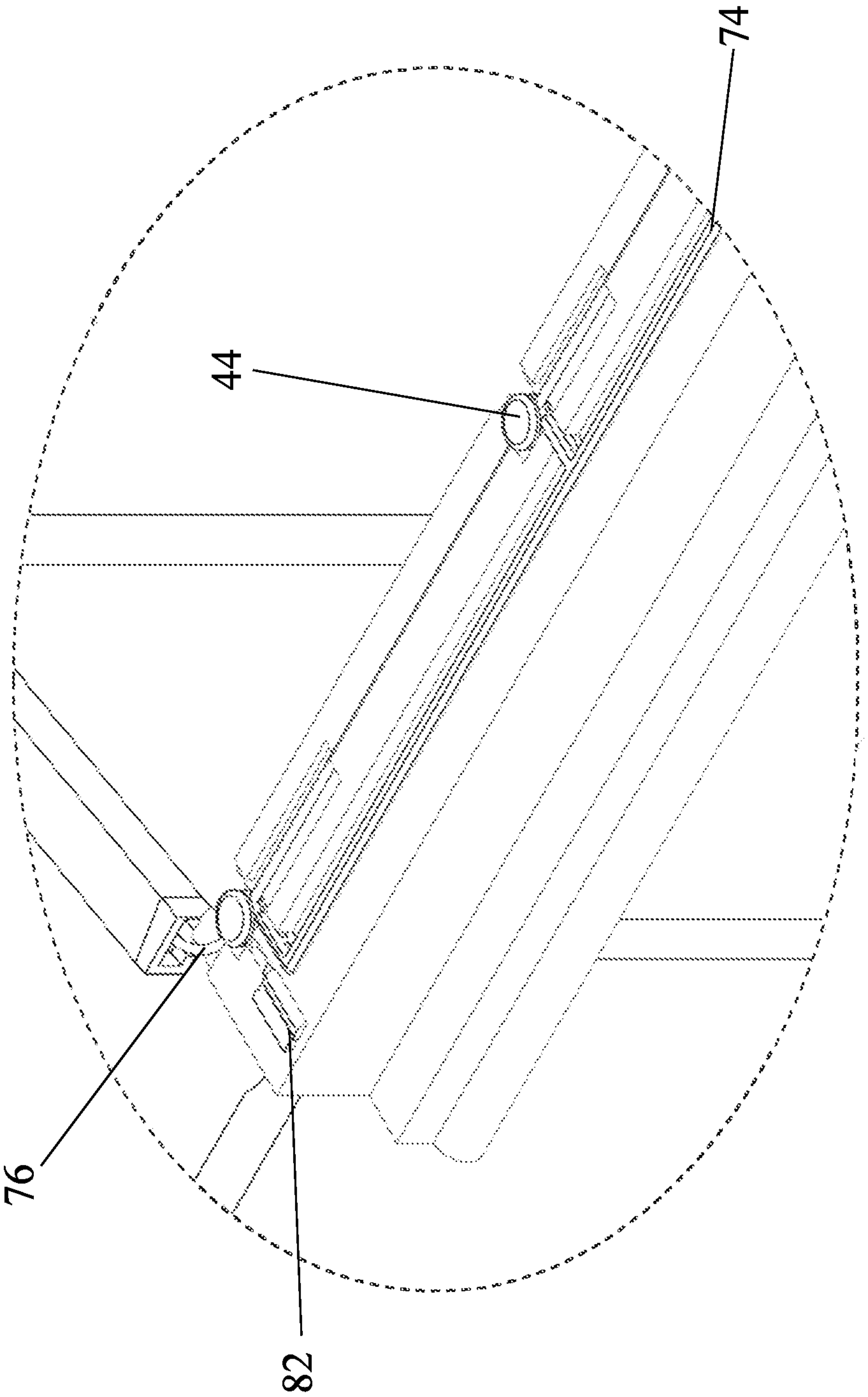
FIG. 22 illustrates a detailed view of the track with the locking structure embedded in the track deactivated, prior to tightening the wall panels together.
Figure 23:
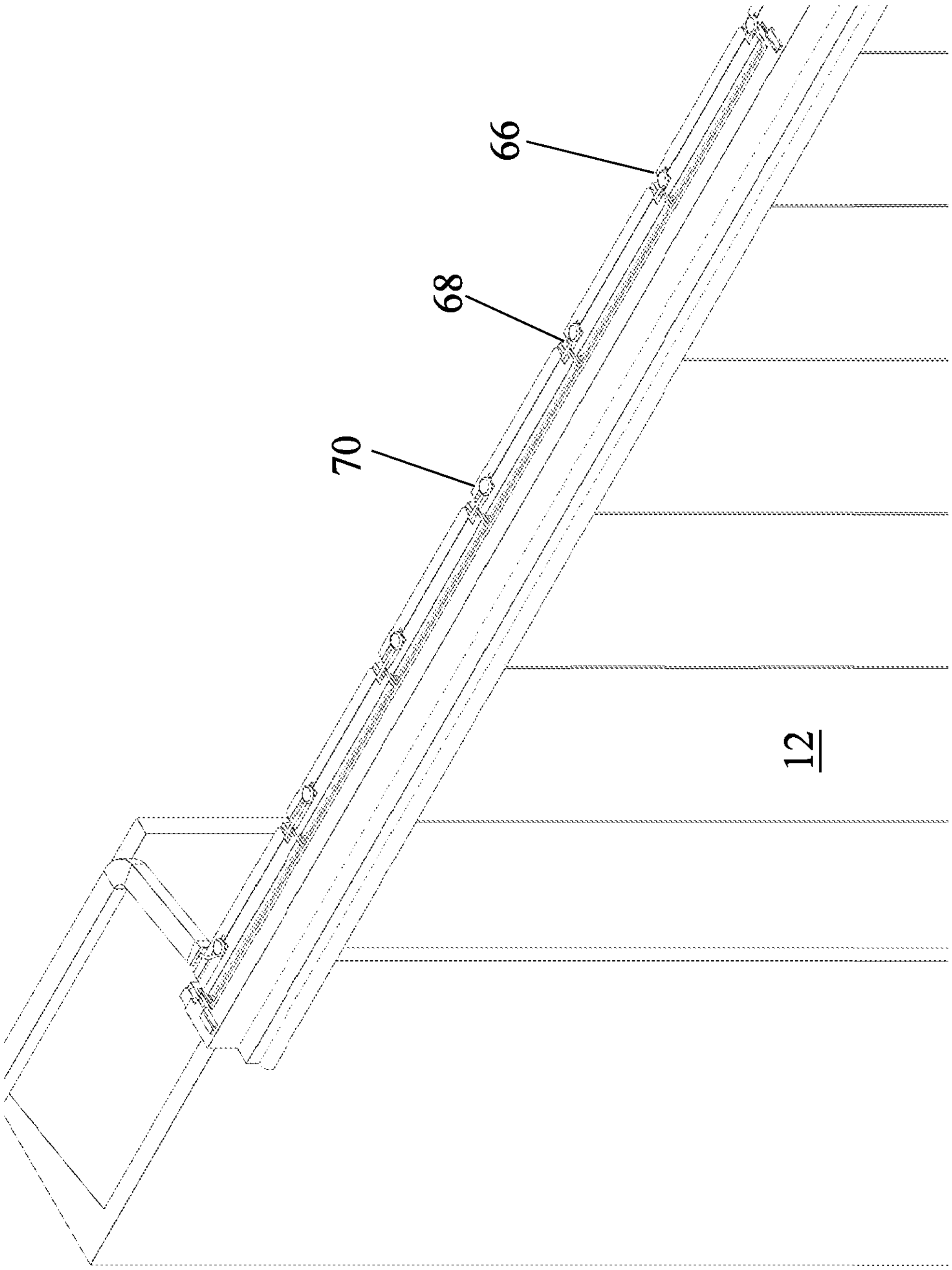
FIG. 23 illustrates a partially cut-away view of the track, showing the wall panel in a fully tightened state with a locking structure embedded in the track deactivated.
Figures 24A, 24B:
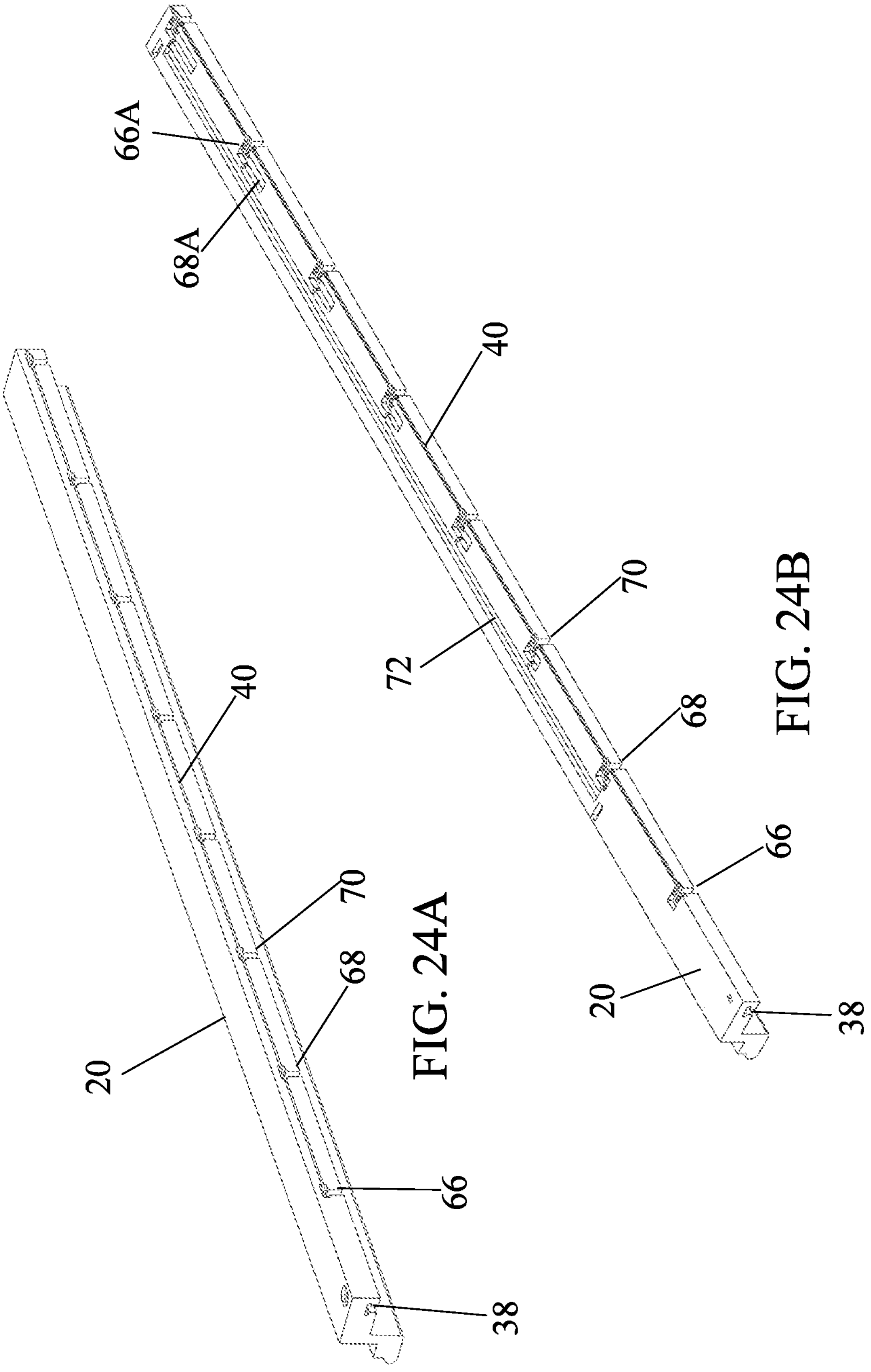
FIG. 24A illustrates a side perspective view of the track.
FIG. 24B illustrates a top perspective view of the track.
Figure 25:
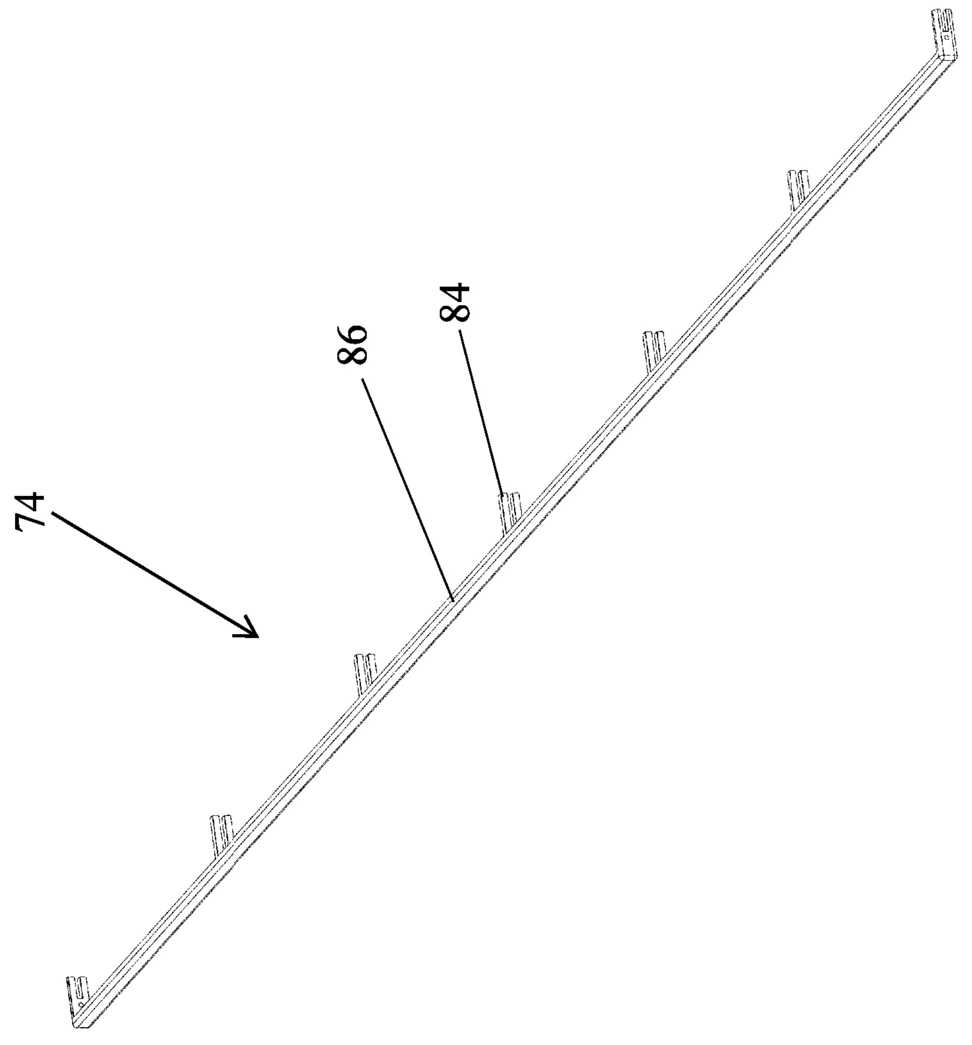
FIG. 25 illustrates a perspective view of a locking structure.

Referring to FIGS. 20 through 25, details of the positioning of the wall panels 12 into the sliding track 20 and the squeezing of the wall is described. As best seen in FIG. 24B, the sliding track 20 can include a plurality of receiving sections, such as first receiving section 66, second receiving section 68, third receiving section 70 and the like. Each of the receiving sections can receive the second pin 44 of each successive wall panel 12 during deployment of the wall panels 12. The first receiving section 66 can include a first region 66A that communicates with the inner edge 20C of the sliding track 20. Each of the other receiving sections (such as second receiving section 68 and third receiving section 70) include a second pin receiving region 68A that communicates with the first region 66A. Thus, the second pin 44 can move into the first region and then, during squeezing of the wall, move into the second pin receiving region 68A. The second pin receiving region 68A may extend at a 90 degree angle from the first region 66A, where the second pin receiving region 68A extends in a direction generally parallel with the longitudinal axis of the sliding track 20. FIG. 22 shows the locking arm 74 being moved out of the way to permit the wall panels to squeeze together. FIG. 23 illustrates the second pins 44 within the second pin receiving region 68A after the locking arm 74 is moved out of the way and the wall panels 12 are squeezed together.

FIGS. 20 and 21 show the second pins 44 in the first region 66A, prior to squeezing the wall panels 12 together. A locking arm 74 can fit into a locking arm channel 72 within the top of the sliding track 20. The locking arm 74 can include a longitudinal shaft 84 with a plurality of locking members 86 extending outward therefrom. The locking arm 74 may be movable within the locking arm channel 72 (with, for example, one or more linear actuators 82, as shown in FIG. 21), where, during expansion of the expansion section, the locking members 86 extend to block the second pins 44 of the wall panels 12 from entering the second pin receiving region 68A. Thus, the gap 22 (see FIG. 2) is maintained between the wall panels 12, thus providing case of expansion. When the wall is squeezed by moving the sliding track 20 back toward the main structure, the locking members 86 are moved out of the way to permit the second pins 44 to enter the second pin receiving region 68A. As can be seen, the second pin receiving regions 68A increase in overall length closer to the main structure. This is due to the need to move the sliding track 20, relative to the wall panel 12, a greater distance nearer the main structure as each of the wall panels 12 are squeezed together.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. An expandable structure comprising:

a main structure;

a first expansion section, the first expansion section expandable outward in a first direction from the main structure to convert the expandable structure from a collapsed state to an expanded state;

walls of the first expansion section are formed from a plurality of wall panels, the wall panels, in a retracted configuration, are stacked with planar interior or exterior faces adjacent each other;

a tightening system operable to push the plurality of wall panels together when in the expanded configuration; and a sliding track operable to move outward from the main structure;

wherein each of the plurality of wall panels is attached to the sliding track, and the sliding track is supporting each of the plurality of wall panels that collectively form the walls of the first expansion section.

2. The expandable structure of claim 1, wherein each of the plurality of wall panels include a first pin, extending upward from a top of each wall panel adjacent a leading edge, and a second pin, extending upward from the top of each wall panel, adjacent a trailing edge.

3. The expandable structure of claim 2, wherein the first pin is rotatably positioned in and slidable along a channel formed along a longitudinal axis of the sliding track.

4. The expandable structure of claim 3, wherein the second pin is disposed in a first guide when the expandable structure is in the collapsed state, the second pin movable through the first guide and a second guide to be positioned within one of a plurality of receiving sections of the sliding track in the expanded state.

5. The expandable structure of claim 4, wherein each of the plurality of receiving sections include a first region, receiving the second pin during expansion of the expandable structure, and a second region, receiving the second pin during tightening of the wall by the tightening system.

6. The expandable structure of claim 5, further comprising a locking arm preventing the second pin from moving from the first region into the second region during expansion of the expandable structure.

7. The expandable structure of claim 5, wherein the second regions of each of the plurality of receiving sections are progressively larger from a distal end of the sliding track to a proximate end of the sliding track, wherein the proximate end is adjacent the main structure when the expandable structure is in the expanded state.

8. The expandable structure of claim 2, wherein the first pin of a leading one of the plurality of wall panels is fixed to the sliding track with a fixation pin.

9. The expandable structure of claim 2, wherein the first pin has a height less than a height of the second pin.

10. The expandable structure of claim 2, further comprising a cable interconnecting each second pin of each of the plurality of wall panels.

11. The expandable structure of claim 1, further comprising a cable interconnecting adjacent ones of the plurality of wall panels.

12. The expandable structure of claim 11, wherein the cable is disposed in a first position when the expandable structure is in the collapsed state and movable into a second position when the expandable structure is in the expanded state.

13. An expandable structure comprising:

a main structure;

a first expansion section, the first expansion section expandable outward in a first direction from the main structure to convert the expandable structure from a collapsed state to an expanded state;

walls of the first expansion section are formed from a plurality of wall panels, the wall panels, in a retracted configuration, are stacked with planar interior or exterior faces adjacent each other;

a first pin extending upward from a top of each wall panel of the plurality of wall panels, adjacent a leading edge;

a second pin extending upward from the top of each wall panel of the plurality of wall panels, adjacent a trailing edge;

a sliding track operable to move outward from the main structure, wherein each of the plurality of wall panels are attached to the sliding track, and the sliding track is supporting each of the plurality of wall panels that collectively form the walls of the first expansion section; and a tightening system operable to push the plurality of wall panels together when in the expanded configuration, wherein:

the first pin is rotatably positioned in and slidable along a channel formed along a longitudinal axis of the sliding track; and the first pin of a leading one of the plurality of wall panels is fixable to the sliding track with a fixation pin.

14. The expandable structure of claim 13, wherein the first pin has a height less than a height of the second pin.

15. The expandable structure of claim 13, wherein:

the second pin is disposed in a first guide when the expandable structure is in the collapsed state, the second pin movable through the first guide and a second guide to be positioned within one of a plurality of receiving sections of the sliding track in the expanded state; and each of the plurality of receiving sections include a first region, receiving the second pin during expansion of the expandable structure, and a second region, receiving the second pin during tightening of the wall by the tightening system.

16. The expandable structure of claim 15, further comprising a locking arm preventing the second pin from moving from the first region into the second region during expansion of the expandable structure, wherein the second regions of each of the plurality of receiving sections are progressively larger from a distal end of the sliding track to a proximate end of the sliding track, wherein the proximate end is adjacent the main structure when the expandable structure is in the expanded state.

17. The expandable structure of claim 13, further comprising:

a first cable interconnecting each second pin of each of the plurality of wall panels; and a second cable interconnecting adjacent ones of the plurality of wall panels.

18. An expandable structure comprising:

a main structure;

a first expansion section, the first expansion section expandable outward in a first direction from the main structure to convert the expandable structure from a collapsed state to an expanded state;

walls of the first expansion section are formed from a plurality of wall panels, the wall panels, in a retracted configuration, are stacked with planar interior or exterior faces adjacent each other;

a first pin extending upward from a top of each wall panel of the plurality of wall panels, adjacent a leading edge;

a second pin extending upward from the top of each wall panel of the plurality of wall panels, adjacent a trailing edge;

a sliding track operable to move outward from the main structure, wherein each of the plurality of wall panels are attached to the sliding track, and the sliding track is supporting each of the plurality of wall panels that collectively form the walls of the first expansion section;

a tightening system operable to push the plurality of wall panels together when in the expanded configuration;

a first cable interconnecting each second pin of each of the plurality of wall panels; and a plurality of second cables, each interconnecting adjacent ones of the plurality of wall panels, wherein:

each second cable is disposed in a first position when the expandable structure is in the collapsed state and movable into a second position when the expandable structure is in the expanded state.

19. The expandable structure of claim 18, wherein:

the first pin is rotatably positioned in and slidable along a channel formed along a longitudinal axis of the sliding track;

the first pin of a leading one of the plurality of wall panels is fixable to the sliding track with a fixation pin;

the first pin has a height less than a height of the second pin;

the second pin is disposed in a first guide when the expandable structure is in the collapsed state, the second pin movable through the first guide and a second guide to be positioned within one of a plurality of receiving sections of the sliding track in the expanded state; and each of the plurality of receiving sections include a first region, receiving the second pin during expansion of the expandable structure, and a second region, receiving the second pin during tightening of the wall by the tightening system.

* * * * *